(12) United States Patent
Hurwitz et al.

(10) Patent No.: US 9,330,277 B2
(45) Date of Patent: May 3, 2016

(54) PRIVACY MANAGER FOR RESTRICTING CORRELATION OF META-CONTENT HAVING PROTECTED INFORMATION BASED ON PRIVACY RULES

(75) Inventors: Joshua B. Hurwitz, Niles, IL (US); Alfonso Martinez Smith, Algonquin, IL (US); Paul C. Davis, Arlington Heights, IL (US); Douglas A. Kuhlman, Inverness, IL (US); Hiren M. Mandalia, Elk Grove Village, IL (US); Loren J. Rittle, Lake Zurich, IL (US); Krunal S. Shah, Chicago, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 670 days.

(21) Appl. No.: 13/528,922

(22) Filed: Jun. 21, 2012

(65) Prior Publication Data

US 2013/0347057 A1    Dec. 26, 2013

(51) Int. Cl.
*G06F 21/00* (2013.01)
*G06F 21/62* (2013.01)
*H04N 21/442* (2011.01)

(52) U.S. Cl.
CPC .... *G06F 21/6245* (2013.01); *G06F 2221/2141* (2013.01); *H04N 21/44204* (2013.01)

(58) Field of Classification Search
CPC ............... G06F 21/00; G06F 21/4345; G06F 2221/2141; H04N 21/44204; H04N 21/4627; H04N 21/8355
USPC .......................................................... 726/1
See application file for complete search history.

(56) References Cited

U.S. PATENT DOCUMENTS 6,253,203 B1    6/2001    O'Flaherty et al.
6,549,922 B1    4/2003    Srivastava et al.
(Continued)

FOREIGN PATENT DOCUMENTS

EP    1737236 A2    12/2006
JP    2000-293421 A    10/2000
(Continued)

OTHER PUBLICATIONS

Office Action for U.S. Appl. No. 13/528,911, dated Jan. 31, 2014, 26 pages.
(Continued)

*Primary Examiner* — William Goodchild
(74) *Attorney, Agent, or Firm* — Fenwick & West LLP

(57) ABSTRACT

A method intercepts correlation instructions related to a plurality of meta-content elements associated with a primary content. The primary content or the meta-content elements may have associated privacy rules. At least one meta-content element of the group is selected as having privacy protected information specified in the privacy rules. A set of meta-content items, of meta-content element, are determined that are subject to a correlation restriction based on evaluation of the privacy rules with respect to each meta-content item contained in the meta-content element, and the privacy rules for the set of meta-content items are enforced. The privacy rule enforcement may involve preventing execution of the correlation instructions, excluding the selected at least one meta-content element from a correlation based on the correlation instructions, excluding the set of meta-content items from a correlation based on the correlation instructions, or restricting access to a correlation result based on the correlation instructions.

15 Claims, 19 Drawing Sheets

(56) References Cited

U.S. PATENT DOCUMENTS

| | | |
|---|---|---|
| 6,859,799 B1 | 2/2005 | Yuen |
| 6,877,134 B1 | 4/2005 | Fuller et al. |
| 6,912,504 B1 | 6/2005 | Rashkovskiy |
| 6,944,185 B2 | 9/2005 | Patki et al. |
| 7,263,714 B2 | 8/2007 | Lowthert et al. |
| 7,460,149 B1 | 12/2008 | Donovan et al. |
| 7,519,273 B2 | 4/2009 | Lowthert et al. |
| 7,574,579 B2 | 8/2009 | Gladwin et al. |
| 7,606,790 B2 | 10/2009 | Levy |
| 7,668,928 B2 | 2/2010 | Newnam et al. |
| 7,688,853 B2 | 3/2010 | Santiago et al. |
| 7,809,603 B2 | 10/2010 | Steelberg et al. |
| 7,814,061 B2 | 10/2010 | Kuberka et al. |
| 7,849,105 B2 | 12/2010 | Prager et al. |
| 7,870,279 B2 | 1/2011 | Chuang et al. |
| 7,904,480 B2 | 3/2011 | Palanisamy |
| 7,917,749 B2 | 3/2011 | Ginter et al. |
| 7,930,356 B2 | 4/2011 | Gawor et al. |
| 7,930,762 B1 | 4/2011 | Blair et al. |
| 7,958,131 B2 | 6/2011 | Bodin et al. |
| 7,958,148 B2 | 6/2011 | Barnes et al. |
| 7,962,937 B2 | 6/2011 | Cho et al. |
| 7,970,761 B2 | 6/2011 | Petri |
| 8,271,751 B2 | 9/2012 | Hinrichs, Jr. |
| 2001/0014891 A1 | 8/2001 | Hoffert et al. |
| 2005/0021570 A1* | 1/2005 | Thompson ............... G06F 1/30 |
| 2005/0022107 A1 | 1/2005 | Dey et al. |
| 2005/0049982 A1* | 3/2005 | Ganapathy ....... G06Q 10/06311 |
| | | 705/400 |
| 2006/0020597 A1 | 1/2006 | Keating et al. |
| 2006/0031216 A1 | 2/2006 | Semple et al. |
| 2006/0173985 A1 | 8/2006 | Moore |
| 2006/0287919 A1 | 12/2006 | Rubens et al. |
| 2008/0049881 A1* | 2/2008 | Huotari ................ H04J 3/0608 |
| | | 375/359 |
| 2008/0243784 A1 | 10/2008 | Stading |
| 2009/0125504 A1 | 5/2009 | Adams et al. |
| 2009/0144130 A1 | 6/2009 | Grouf et al. |
| 2009/0216769 A1 | 8/2009 | Bellwood et al. |
| 2009/0248688 A1* | 10/2009 | Kim ................ G06F 17/30044 |
| 2009/0299990 A1 | 12/2009 | Setlur et al. |
| 2010/0023491 A1 | 1/2010 | Huang et al. |
| 2010/0125604 A1* | 5/2010 | Martinez ........... G06F 17/30867 |
| | | 707/784 |
| 2011/0016172 A1 | 1/2011 | Shah |
| 2012/0236005 A1 | 9/2012 | Clifton et al. |
| 2013/0054603 A1 | 2/2013 | Birdwell et al. |
| 2013/0166587 A1 | 6/2013 | Berry |

FOREIGN PATENT DOCUMENTS

| | | |
|---|---|---|
| JP | 2000293421 | 10/2000 |
| JP | 2011-3987 A | 1/2011 |
| JP | 2011003987 | 1/2011 |

OTHER PUBLICATIONS

Notice of Allowance for U.S. Appl. No. 13/528,911, dated Sep. 29, 2014, 20 pages.

Office Action for U.S. Appl. No. 13/528,917, dated Sep. 3, 2013, 24 pages.

Office Action for U.S. Appl. No. 13/528,917, dated Jul. 14, 2014, 40 pages.

United States Patent and Trademark Office, "Non-Final Rejection" for U.S. Appl. No. 13/528,917 dated Apr. 4, 2013, 15 pages.

Melia, Mark & Pahl, Claus. (2010). Model-driven description and validation of composite learning content, DORAS DCU Online Research Access Service. 6 pages.

Patent Cooperation Treaty, "PCT Search Report and Written Opinion of the International Searching Authority" for International Application No. PCT/US2013/043239 dated Oct. 30, 2013, 12 pages.

Wang et al., "A Proposal on Video Editing System Coping with Rights Inheritance Management for Secondary Content" Electrical Engineering, 2008, ICEE 2008 Second International Conference on, IEEE, Piscataway, NJ, USA, Mar. 25, 2008 2 pages.

Patent Cooperation Treaty, "PCT Search Report and Written Opinion of the International Searching Authority" for International Application No. PCT/US2013/043241 dated Nov. 5, 2013, 11 pages.

Sundaram et al., "A Utility Framework for the Automatic Generation of Audio-Visual Skim" ACM Multimedia Dec. 2002, Dec. 6, 2002, pp. 189-198, Retrived from the Internet: //www.ee.columbia.edu/1n/dvmm/publications/02/acmm2k2.pdf.

Patent Cooperation Treaty, "PCT Search Report and Written Opinion of the International Searching Authority" for International Application No. PCT/US2013/043242 dated Oct. 29, 2013, 11 pages.

United States Patent and Trademark Office, "Non-Final Rejection" for U.S. Appl. No. 13/528,911 dated Aug. 26, 2013, 9 pages.

Office Action for U.S. Appl. No. 13/528,917, dated Feb. 3, 2015, 33 pages.

\* cited by examiner

PRIVACY MANAGER FOR RESTRICTING CORRELATION OF META-CONTENT HAVING PROTECTED INFORMATION BASED ON PRIVACY RULES

CROSS-REFERENCE TO RELATED APPLICATIONS

This application is related to co-pending U.S. patent application Ser. No. 13/528,911, "CONTENT RIGHTS PROTECTION WITH ARBITRARY CORRELATION OF SECOND CONTENT," and co-pending U.S. patent application Ser. No. 13/528,917, "CORRELATION ENGINE AND METHOD FOR GRANULAR META-CONTENT HAVING ARBITRARY NON-UNIFORM GRANULARITY," each of which are assigned to the same assignee as the present application, and are incorporated by reference herein in their entireties.

FIELD OF THE DISCLOSURE

The present disclosure relates generally to content metadata, or meta-content, and accessing and utilizing metadata or meta-content.

BACKGROUND

Content, and the various types or forms of content that have been developed, has ushered in the use of associated data commonly referred to as metadata. The development of metadata has itself evolved into an array of metadata types and forms. In its earliest manifestation, metadata provided basic information associated with the content. For example, a photograph might have associated metadata for providing the time the photograph was taken, the particular camera and camera settings used to take the photograph, and even information identifying the copyright holder. As metadata has evolved, the amount of information that can be stored in association with content may be viewed as another form of content itself, i.e. a "meta-content," in that the meta-content may exist separately from the content and take on an independent purpose of its own. In other words, meta-content may exist independently from its associated "primary" content. Although the term "meta-content" may appear to blur the demarcation between content as a form of data, and metadata, the term "meta-content" should be understood as referring to secondary content that provides information about a primary content or, alternatively, secondary content that is associated with a primary content. For example, search engines may use meta-content to enable producing search results for a wide range of criteria related to a primary content. Alternatively, meta-content may include information relating to a study or analysis of the primary content.

Primary content may contain personal information, or other sensitive information, and may have various related secondary content, i.e. meta-content such as, associated video clips, voice-overs and/or independent sections such as headlines, local news, international news, sports, weather, entertainment, etc. which are not independently identifiable. However, the meta-content may include some, or all, of the personal information or other sensitive information contained in the primary content.

Examples of this include simultaneous streams for textual description of the primary content (such as mentioned briefly above, where title, associated video clips, and voice-overs describe each section), scene segmentation based on audio-visual signal processing and scene boundary detection, parallel feed insertion where specific sections are associated with secondary content to be associated exclusively with that particular section), key frame extraction with automatic storyboarding, document authorship, and others. As a result, there is a risk that pieces of information from various pieces of meta-content may be aggregated and/or correlated to obtain personal information or other sensitive information that creates a risk of privacy invasion as well as other possible security concerns.

BRIEF DESCRIPTION OF THE DRAWINGS

FIG. 6, 609; FIG. 7, 711 and FIG. 8, 809, when the correlation instructions involve a time-related information aggregation including video, audio and closed caption analysis results merged and ordered in time.

FIG. 6, 609; FIG. 7, 711 and FIG. 8, 809, when the correlation instructions involve locating video event sequences including flash frame, logo and black frame in a specified order, and audio events including a station-identifier musical signature.

FIG. 6, 609; FIG. 7, 711 and FIG. 8, 809, when the correlation instructions involve identifying closed caption text having the words "stop, police" near in time to audio analysis results containing gunshots, related to drama television shows.

FIG. 6, 609; FIG. 7, 711 and FIG. 8, 809, when the correlation instructions involve closed caption analysis results related to news casts and containing the phrase "election results."

FIG. 6, 609; FIG. 7, 711 and FIG. 8, 809, when the correlation instructions involve construction of a heat-map against either simple counts or complex aggregated statistics of meta-content items within a conjoint grouping of meta-content elements.

DETAILED DESCRIPTION

The present disclosure provides a method and apparatus for enforcing privacy rules to prevent correlation and/or aggregation of personal, private information or other sensitive information that can be gleaned by correlating meta-content elements.

A method of the various embodiments includes intercepting correlation instructions related to a plurality of meta-content elements. The meta-content elements are associated with a primary content that may have associated privacy rules. The primary content, the meta-content elements, or both, may have associated privacy rules. At least one meta-content element of the plurality of meta-content elements is selected as having privacy protected information specified in the privacy rules. The method determines a set of meta-content items of the selected meta-content element that are subject to a correlation restriction based on evaluation of the privacy rules with respect to each meta-content item contained in the meta-content element. The method proceeds to enforce the privacy rules for the set of meta-content items.

Enforcing the privacy rules for the set of meta-content items may be accomplished by one or more actions including preventing execution of the correlation instructions, excluding the selected at least one meta-content element from a correlation based on the correlation instructions, excluding the set of meta-content items from a correlation based on the correlation instructions, or restricting access to a correlation result based on the correlation instructions.

An aspect of the disclosure provides an apparatus, with at least one programmable processor, and memory, operatively coupled to the programmable processor. The memory contains executable instructions for execution by the at least one processor, where the at least one processor, upon executing the executable instructions is operable to perform the methods of operation described herein. The aforementioned executable instructions may also be stored by a non-volatile, non-transitory memory that may be loaded to the at least one processor for execution.

A wide array of applications is made possible and enabled by the privacy manager and method of operation including enforcement of legal requirements for privacy of protected information and other possible applications.

Figure 1:
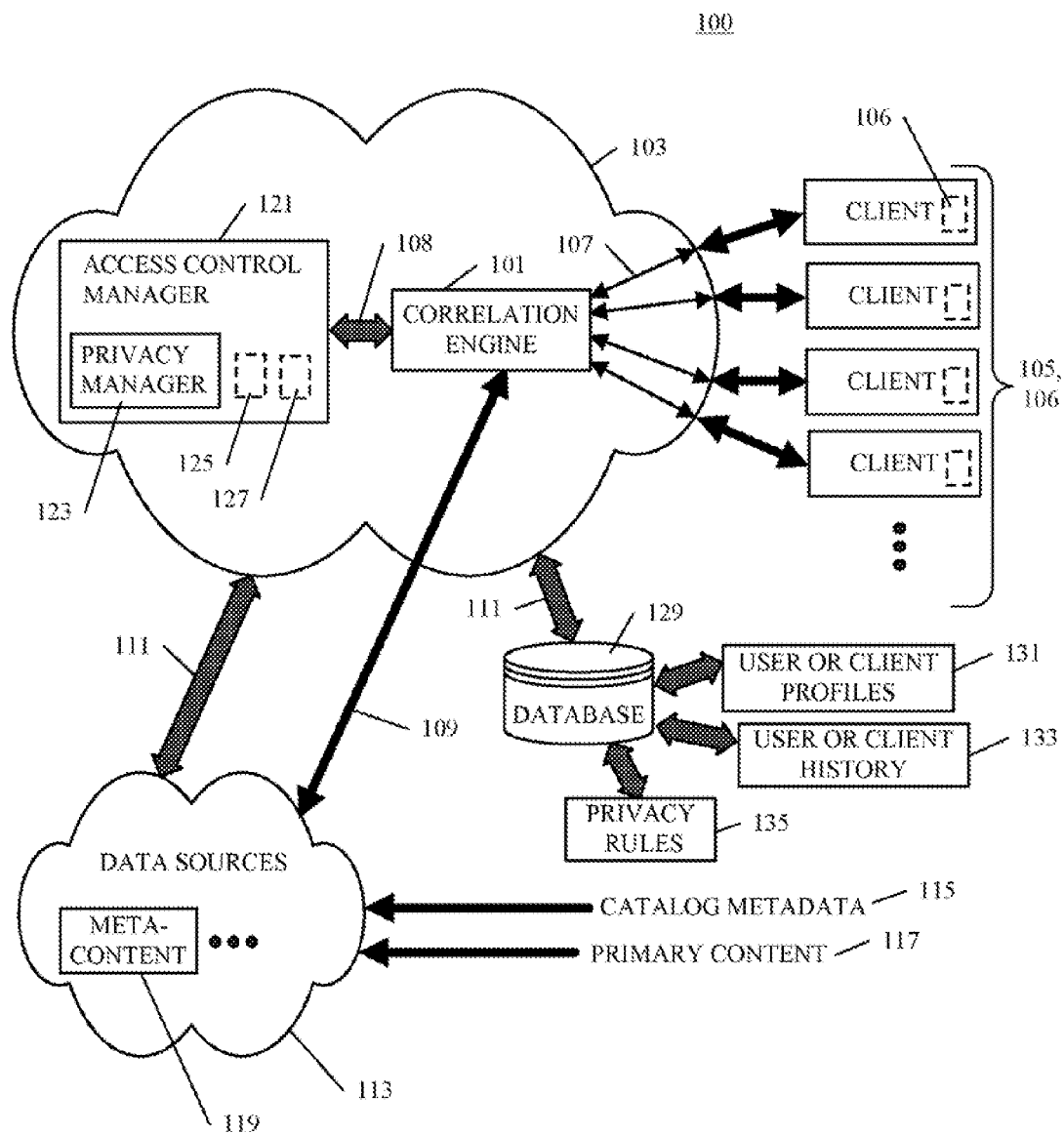
FIG. 1 is a block diagram of a system architecture that includes an access control manager having a privacy manager in accordance with the embodiments.

Turning now to the drawings wherein like numerals represent like components, FIG. 1 illustrates a system architecture 100 that includes an access control manager 121 which includes a privacy manager 123 in accordance with the embodiments. The access control manager may also include a policy manager 125 and a configuration manager 127. The system architecture also includes a correlation engine 101 which is operatively coupled to the access manager 121 and thereby to the privacy manager 123. The privacy manager 123 may intercept correlation results, requests or instructions via a connection 108 to the correlation engine 101. The connection 108 may be a network connection or may represent data interception by the privacy manager 123 between the correlation engine 101 and the network 103. The privacy manager 123 may also access user or client profiles 131 and/or user or client history 133, both of which may be contained in a database 129 accessible via network connection 111.

In accordance with the embodiments, the privacy manager 123 restricts actions and/or results that may be obtained by the correlation engine 101, which correlates and indexes metadata and/or meta-content. The correlation engine 101 may be a part of, or contained within, a network 103. The network 103 may be any suitable network and may contain a distributed file system as will be described in further detail below. The network 103 may also contain or be able to communicate with a variety of data sources 113 via in some cases, another network connection 111. The correlation engine 101 is able to access the data sources 113 as shown by the communication path 109. The variety of data sources 113 may provide primary content, and associated metadata and/or meta-content, received from a variety of providers. The variety of providers may provide, for example, catalog metadata 115 and various forms of primary content 117 such as, but not limited to video content, audio content, etc. The catalog metadata 115 may be independent metadata and/or meta-content, or may be associated with corresponding pieces of primary content 117. The system architecture 100 shown in FIG. 1 includes a plurality of clients 105 which may be devices having various client applications that may interact with the correlation engine 101. The clients 105 may interact with the meta-content elements 119 located in the data sources 113, via the network connection 111, as will be discussed further below. Some or all of the clients 105 may also include a local user or client profile 106, as an alternative to the user of client profiles 131 stored remotely in database 129.

The term "client" as used herein may refer to an electronic device, such as, for example, a smart phone, laptop, personal digital assistant (PDA), electronic book reader, tablet, personal computer (PC), etc., any of which may employ any suitable network access technology in order to access the network 103. A "client" may also be used herein to refer to a web service, a server, various applications such as, but not limited to, an analysis application, a report generator, or other components within a back-end system, any of which may also employ any suitable network access technology in order to access the network 103. That is, the term "client" as used herein also collectively refers to a "client application" or "application" which may be software running on a processor of an electronic device and which may send a request 107 to the correlation engine 101. For example any one of the clients 105 may send a request 107 to the correlation engine 101 to obtain information related to primary content 117 or of meta-content associated with the primary content 117, and/or to obtain primary content 117, associated meta-content elements 119, catalog metadata 115 or various composites. Therefore, the user or client profile 106 may be related to a specific user of a device, (i.e. a "user profile"), or may be a profile related to the device itself, or related to an application, (i.e. a "client profile").

The privacy manager 123 may access the user or client profiles 106, or remotely stored user or client profiles 131 stored in database 129. The correlation engine 101, by the communication path 109, may communicate with the data sources 113 to obtain, as necessary, access to catalog metadata 115 and/or meta-content elements 119. For example, one or more of the clients 105 may be an application that works with various meta-content. One of the clients 105 may include an application that may send a request 107 to correlation engine 101 that includes correlation instructions and that may also provide identification information related to primary content 117 or related to meta-content elements 119 associated with primary content 117. The request 107 may also include catalog metadata 115 as the identification information for either the primary content 117 or the meta-content elements 119. As will be described in further detail below, the correlation engine 101 performs a correlation in accordance with the correlation instructions received in the request 107. The correlation engine 101 returns a result which may include meta-content elements, meta-content segments, meta-content items, or composites of any of these, associated with the primary content. The correlation engine 101 may also return the identity of a primary content that is related to various meta-content elements, a composite of meta-content elements or a composite of meta-content segments or items as will be described in further detail below. The correlation instructions may be executable code or references to executable code, or combinations of both. The executable code may be stored in local memory or remotely, for example, on a server. The executable code may be native code, universal byte code or a script language. For example, the correlation instructions may be written in Structure Query Language (SQL). The correlation instructions may contain references to stored SQL procedures. The correlation instructions may also be written in a high-level, domain specific language, and/or may be written in first-order predicate logic. In accordance with the embodiments, the privacy manager 123 may intercept the correlation instructions and will restrict access and/or prevent correlations of certain meta-content elements, meta-content segments, and/or meta-content items.

The privacy manager 123 operates in conjunction with privacy rules 135 which may be contained in database 129 or in metadata or meta-content associated with a primary content. In some embodiments, the privacy rules may be contained in, or associated with, a user profile, such as user or client profiles 131. The privacy rules may be expressed in a form mapped to a rules engine such as, but not limited to, Prolog, or a business rule management system such as, but not limited to, Drools. The privacy rules may also be expressed as first-order predicate logic, or customized code, or in any other suitable programming language etc. The privacy rules may be contained in a meta-content element associated with a primary content, and/or other meta-content elements associated with the primary content. Additionally, privacy rules applicable to primary content are inherited by meta-content elements generated from the primary content. The privacy rules enable the privacy manager 123 to prevent, among other things, the co-occurrence of meta-content items that are restricted, that is, privacy protected, based on the privacy rules. For example, the privacy manager 123 may prevent co-occurrence by preventing two or more meta-content items from being included in the same meta-content element, and/or may prevent two or more meta-content items from appearing in an aggregation or correlation result. In other words, the privacy manager 123 prevents co-occurrence of information in correlation or aggregation results when that co-occurrence of information could reveal other information (by conclusions, inference, deduction, etc.) not obtainable without the correlation or aggregation. Therefore, the privacy manager 123, according to the applicable privacy rules, can prevent the correlation of information from different sources, or delete certain results, or omit certain meta-content from a correlation process that would create results that could reveal information not obtainable without the correlation. The privacy rules 135 may therefore place a correlation restriction on certain information objects such as meta-content elements, meta-content segments and/or meta-content items to either prevent any correlation at all or to prevent co-occurrence of the correlation restricted information object. The privacy rules 135 may be created by authors/owners of any content such as primary content and/or meta-content, and may also be revised, added to, or deleted by the authors/owners. Additionally, privacy rules may be inherited by any content that uses some portion or all of any content that has applicable privacy rules. For example, an analysis server may create analysis meta-content from various pieces of primary content. Some or all meta-content items and/or meta-content segments that form the meta-content element may have inherited privacy rules that are inherited from their associated primary content. In other words, privacy rules cannot be violated by extracting portions of protected content in an attempt to avoid the privacy rules of the source content (i.e. the "primary" content).

Figure 2:
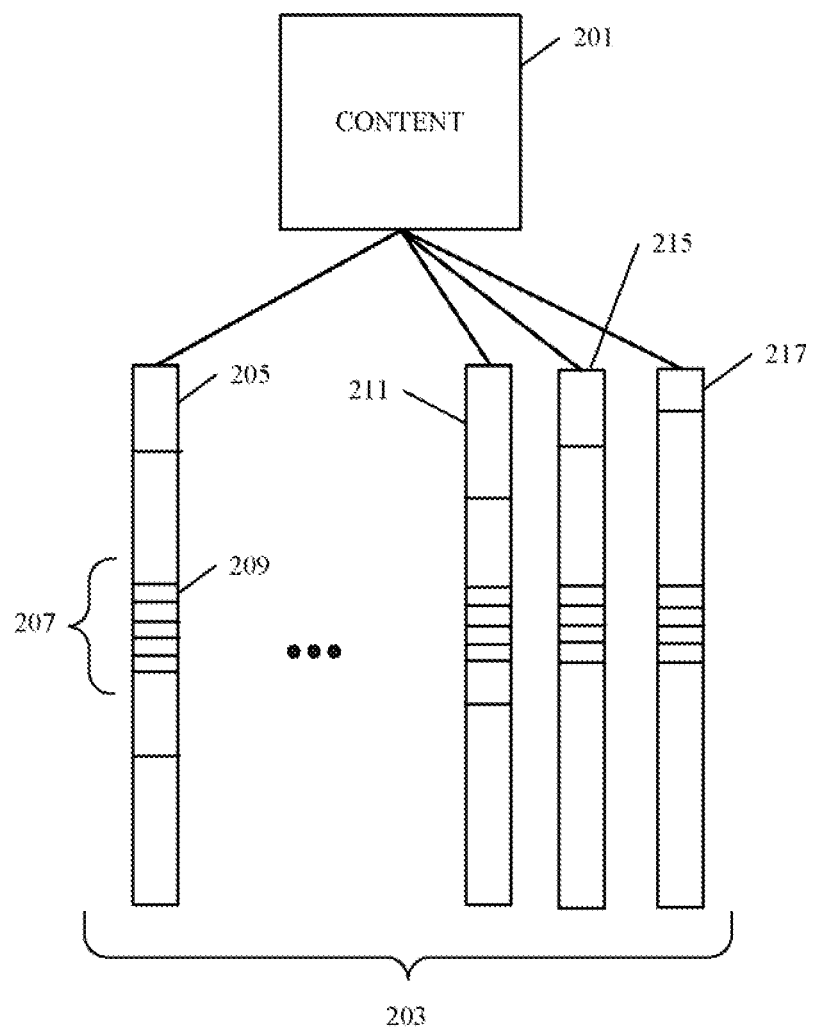
FIG. 2 is a block diagram illustrating the relationship of content to various granular meta-content elements where each meta-content elements granularity defines meta-content segments and items.

FIG. 2 illustrates the relationship of primary content 201 to associated meta-content elements 203. As shown in FIG. 2 a primary content 201 may be associated with a plurality of meta-content such as meta-content element 205, 211, 215 and 217. Each of the meta-content elements, such as meta-content element 205, has an associated but arbitrary granularity. The granularity of the meta-content elements may be related to segmentation based on intervals of time, location, or any other suitable criteria. As shown in FIG. 2, the meta-content element 205 includes meta-content segment 207 which is further subdivided into meta-content items 209.

The term "meta-content" as used herein may encompass, or include, various types and forms of metadata associated with a piece of content. That is, the term meta-content as used herein may refer to metadata that may be considered content in and of itself. For example, such meta-content may be a multimedia content or other audiovisual content such as a "director's cut" of a movie content, or may be analysis output from a visual detector or some other analysis tool. In other words, meta-content may include other content (i.e. "second" or "secondary" content) that provides, but is not limited to, information, analysis, contextual information, etc., about or related to the main or primary content. Such meta-content may include, but is not limited to, date information, time information, location information, annotations, various properties of the content, keyframes, excitement level, associated Twitter® posts, facial recognition information, optical character recognition, object recognition, speech-to-text or other speech recognition information, closed captioning, analysis of text streams (such as closed captioning) to produce key-term extraction, named entity recognition, other text analyses, related content, related segments, Twitter® feeds, excitement levels, aggregation of an analysis, summaries, and the like, etc. A "meta-content element" as used herein refers to a piece of meta-content, in any of the various meta-content forms as described above, that may be indexed and searchable using an index scheme. A meta-content element may be subdivided into "meta-content items" when an item corresponds to a "grain" or granularity of the meta-content element. For example, as shown in FIG. 2, a meta-content element 205 may have a time based granularity where a meta-content item 209 may be defined as a time interval in seconds, milliseconds, etc. As illustrated in FIG. 2, groups of contiguous meta-content items are referred to herein as "meta-content segments" such as meta-content segment 207. In accordance with the embodiments, the primary content 201, as well as the meta-content elements 203, may have associated privacy rules. In some embodiments, one of the meta-content elements 203 may contain the privacy rules. As mentioned above, the privacy rules may also be contained in, or associated with, a user profile. Although FIG. 2 illustrates a "primary content" 201 having associated meta-content elements 203, the content scheme is flexible and may be considered a hierarchical scheme. For example, any one of the meta-content elements 203 may be considered to be the "primary content." In this scenario, the meta-content element may have its own set of associated meta-content elements. The privacy rules may be inherited by meta-content elements, for example, when conditional rules along with privacy rules allow creation of the meta-content element, any of these rules may coerce inheritance of privacy rules during or after creation. In cases where meta-content elements are created by the primary content author/owner, the author/owner may modify, delete, or create new or additional privacy rules that apply to the new meta-content.

In the example provided in FIG. 1, the data sources 113 may provide various form of meta-content elements 119, which may include associated catalog metadata 115, and may include closed captioning information, visual detector analysis data, audio, director's cut video, etc. That is, any particular piece of primary content 117 may have various associated meta-content elements 119, as well as associated catalog metadata 115. Additional meta-content elements may also be created and/or added at any time by the various clients 105. The meta-content elements 119, each include granular segments that may be viewed as partitioning the meta-content elements. For example, as shown in FIG. 2, meta-content element 205 has a meta-content segment 207 and granular meta-content items 209. The granular segments may be related to periods of time, but are not limited to time. For example, a television news cast may consist of several stories, each of which has its own unique associated meta-content segments. The granular segmentation of the meta-content is arbitrary, in that, the granularity is determined by how the meta-content is generated. For example, a visual detector analysis tool of one of the clients 105, may produce a meta-content element that includes granularity different than that of meta-content element 205. That is, the granularity is non-uniform between or among meta-content elements, and is arbitrary in that it is determined by the method or application that generated the meta-content element.

The correlation engine 101 may analyze the granular segments of each meta-content element, of meta-content elements 119, and may create a correlation between various segments and/or items of various meta-content elements 119. The correlation engine 101 may also normalize indexing schemes used by any of the meta-content elements 119, prior to performing a correlation. The correlation engine 101 may also increase, or decrease, the granularity of meta-content element segments and items in order to facilitate index normalization. That is, the correlation engine 101 may perform some level of synchronization and/or alignment of meta-content segmentation. For example, the correlation engine 101 may create a correlation among certain granular segments of meta-content elements 205 and 211. In an example case where the granular segmentation of meta-content elements 205 and 211 are time based, the correlation engine 101 may increase granular segmentation of one, or both, meta-content elements as needed to achieve synchronization. However, correlations between meta-content element segments may be based on various other criteria such as, but not limited to location, context, or other analysis related criteria. For example, the correlation of the meta-content elements may be location related correlations. Among other advantages, the normalization enables forming correlations between meta-content elements at the level of meta-content segments and/or meta-content items.

The system architecture 100 may include various servers and data storage, etc., that are operatively coupled to each other via network connections. For example, the meta-content elements 119 may be stored on a content server or data repository in some embodiments. The correlation engine 101 may also be located on a server and may be a distributed function, distributed among several servers. The correlation engine 101 may access the meta-content, via operative coupling providing a communication path 109 between the correlation engine 101 and the meta-content (i.e. to any content server, data repository, etc.) and facilitated by a network or any other suitable connectivity.

Figure 3:
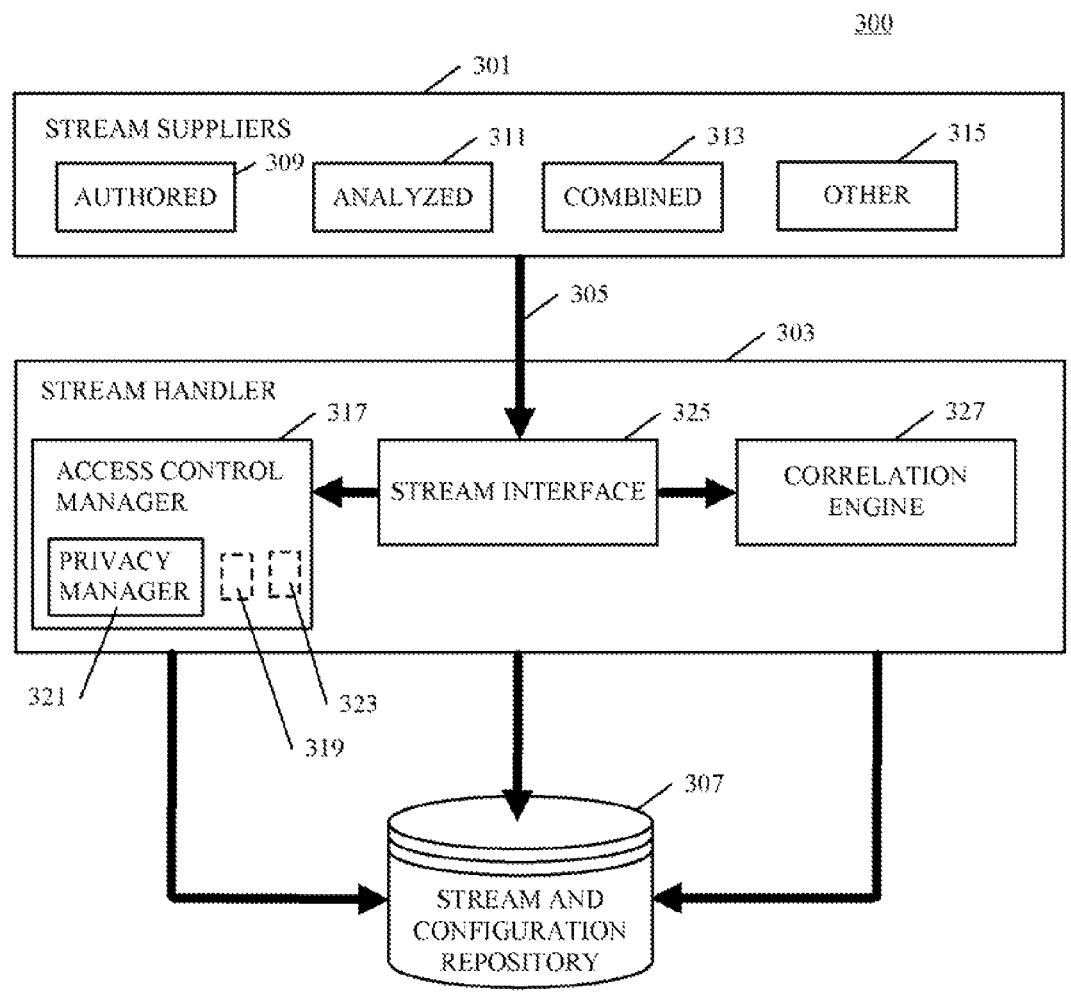
FIG. 3 is a block diagram of a system architecture in accordance with some embodiments where a stream handler includes an access control manager having a privacy manager.

FIG. 3 illustrates example system architecture 300 in accordance with one embodiment. The system architecture 300 enables the annotation, storage, retrieval, and utilization of catalog metadata and/or meta-content elements, in order to enhance the semantic meaning and interpretation of a multiplicity of catalog metadata and/or meta-content elements or streams associated with a primary content, such as, but not limited to an audiovisual content, a textual content, or a video game.

The system architecture 300 includes a plurality of stream suppliers 301 which are operatively coupled via, for example, a network connection 305, to a stream handler 303. The stream suppliers 301 provide various meta-content elements associated with primary content and may include among other things, authored meta-content elements 309 analyzed meta-content elements 311, combined meta-content elements 313 or other meta-content elements 315, all of which may be generated or produced by various associated client applications or tools. The stream handler 303 in accordance with the embodiments includes an access control manager 317 operatively coupled to a stream interface 325 which may restrict access to meta-content elements base on conditional rules, and/or privacy and security requirements. The access control manager 317 includes a privacy manager 321 in accordance with the embodiments, which enforces privacy rules associated with primary content and associated meta-content. A correlation engine 327 is also operatively coupled to the stream interface 325 and, therefore, either the access control manager 317 or the correlation engine 327 may access meta-content elements from the plurality of stream suppliers 301. The stream handler 303 may also access the stream and configuration repository 307 for storing meta-content elements and metadata as necessary.

Figure 4:
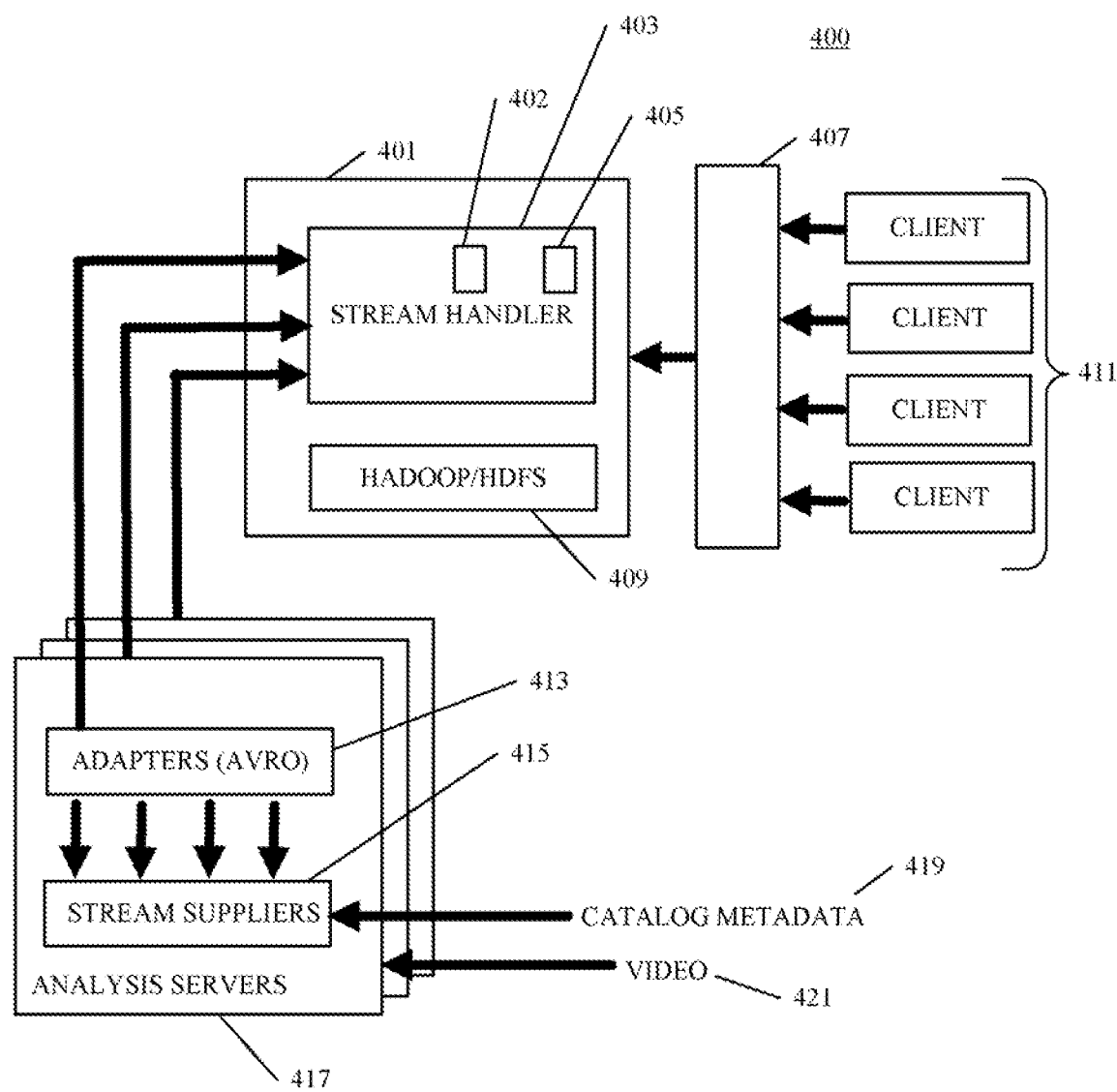
FIG. 4 is a block diagram providing details of a system architecture 400 example having a privacy manager and a correlation engine within a network having a distributed file system.

FIG. 4 provides another example where a stream handler 403 is included in a distributed file system 401. The stream handler 403 includes a privacy manager 402 and a correlation engine 405. The distributed file system may be for example a HADOOP/HDFS based distributed file system 409. As shown in FIG. 4 catalog metadata 419 and primary content such as video 421 may be utilized by stream suppliers 415 in conjunction with analysis servers 417. The plurality of stream suppliers 415 may provide data to the distributed file system 401 via, for example, AVRO adapters 413 to provide for simple integration in reading and writing of data files between the stream suppliers 415 and the distributed file system 401. In other words the AVRO adapters allow for the file schema to be stored along with the file within the distributed file system 401 so that any of the clients 411 can access to the files by using the defined schema. That is, the schema associated with each stored file may be present within each file stored within the distributed file system 401. As understood by those of ordinary skill, the AVRO schema may be defined using for example, JavaScript Object Notation (JSON). However, other file schemas using other data interchange formats may be used. Similar to the example discussed with respect to FIG. 1, the plurality of clients 411 access the distributed file system 401 by access network 407 to facilitate communication with the correlation engine 405 which is contained within the stream handler 403. The privacy manager 402 will enforce privacy rules associated with primary content and/or meta-content to prevent the correlation engine 405 from creating results that would violate the privacy rules.

Given that catalog metadata 419 exists, "sub-program" catalog metadata and/or other meta-content elements, can be added to the distributed file system 401 by the stream suppliers 415. For example, turning to FIG. 3, authored meta-content elements 309 may be created using a meta-content authoring console (i.e. an authoring "client application" or "tool"), which may provide an operator with the ability to manually generate meta-content elements. Likewise, analyzed meta-content 311 may be created via a catalog metadata or meta-content analyzer, which may be located on the analysis servers 417 shown in FIG. 4. Such analyzers may be one of a family of client applications or tools capable of processing primary content such as audiovisual content referred to in a catalog metadata repository, and generating fine-grained descriptors on a specific domain and associated with a given time within the duration of the a primary content or meta-content element. Examples include, but are not limited to, close-captioned generators and scene change detectors.

Such analyzers may also provide suggestions to the meta-content authoring console mentioned above, in order to assist the manual generation of meta-content elements. In one example, an operator may use a meta-content authoring console to manually enter editorial information on a primary content. If the primary content is a movie, the operator might enter the editorial information for all the scenes in the movie, and scene segmentation information may be automatically extracted by a meta-content analyzer and provided to the meta-content authoring tool. The information may be presented to the operator via a user interface, to help guide the manual editing of, for example, catalog metadata for each scene of the movie.

For purposes of the example of FIG. 3 and FIG. 4, meta-content elements are shown as "streams" (or meta-content streams) such as multimedia streams, closed captioning, and other real-time text, etc. It is to be understood that this example is helpful for explanation, but that the meta-content elements are not limited to such "streams." In the FIG. 3 example, the stream and configuration repository 307 stores meta-content elements (i.e., streams, in this example) associated with various pieces of primary content. The streams may be generated and added to the stream and configuration repository 307 by either an authoring tool or a meta-content analyzer as follows. Either an authoring tool or a meta-content analyzer, of stream suppliers 301, may access the stream interface 325 to request the creation of a new stream of a given domain type for a given primary content, such as an audiovisual content, or to open an existing stream of the given domain type for that primary content. The stream interface 325 may access the stream and configuration repository 307 via a configuration manager 323 of the access control manager 317. The access control manager 317 may include several modules, such as a policy manager 319, a privacy manager 321, and the configuration manager 323. The policy manager 319 may determine whether the entity requesting access has authorization to access the requested meta-content and has permission to perform various usage activities such as, but not limited to, viewing, analyzing, editing, etc. The privacy manager 321 may access user or client histories 133, and/or user or client profiles 131 that may contain user, device, server, or application specific information. For example, the various stream suppliers 301 may have tools such as the authoring tool example provided above, that has an associated user history and/or user profile. The privacy manager 321, in accordance with the embodiments, may restrict or prohibit certain information from being collected into metadata or meta-content, where that information is related to the user and the user's access to primary content or meta-content. The privacy manager 321 works with the access control manager 317 policy manager 319, to ensure that users who require no data collection in their context are not shown or provided primary content or meta-content, where a usage policy for that primary content or meta-content requires data collection from the user in order to be consumed. In other words, some primary content and/or meta-content authors or owners may set usage policies where a set of conditional rules require certain types of information to be collected from the users. Because such information collection may not be appropriate for certain users, the privacy manager 321 may, in some embodiments, block content and/or meta-content for those specific users. In some embodiments, the privacy manager 321 may accomplish this by obtaining privacy rules contained in a user profile. Because the privacy rules would prevent collection of certain data from the user, the privacy manager 321 would prevent that user from accessing any content, or any meta-content, that would violate the restriction on collection of data.

Where access is allowable under privacy rules, and assuming a stream of the requested type exists for the request, the configuration manager 323 may return a handle for the requested meta-content stream to the stream interface 325. If a stream of the requested type does not exist for the indicated primary content, the access control manager 317 may confer permission to create a meta-content stream of the given type in the stream and configuration repository 307, and the configuration manager 323 may associate it with the primary content using the primary content's unique identifier, returning a handle to the new empty stream to the stream interface 325. The configuration manager 323 may retain a header with information on every stream present in the stream and configuration repository 307. The header may include information such as, but not limited to, a primary content identifier such as an audiovisual content identifier, catalog metadata domain type, primary content duration, time units for the particular catalog metadata stream, and stream handle, etc. Once the stream interface 325 has a stream handle, it can makes it available to the stream suppliers 301 for use by, for example, a meta-content analyzer or a meta-content authoring console to be embedded in future read or write requests from those modules to the stream and configuration repository 307. Likewise, once meta-content is available for a given primary content and domain type, it is made available and accessible for read and write operations based on policy (via policy manager 319 and privacy manager 321) to external applications via, for example, secure and access-controlled connections.

In the FIG. 3 example, requests to read or write meta-content are made through the stream interface 325. The stream interface 325 handles stream writes by supporting typical list data structure operations such as insert, add, and delete. Write requests also include the stream handle, the desired insertion point in the stream (sequentially at the end or by specific index number), and the meta-content element to be inserted at the requested insertion point. Meta-content elements may include, among other things, a start time unit, an end time unit, a placement index, and a desired annotation.

Read requests may be handled by the stream interface 325 using a variety of methods. A request for a meta-content steam will indicate the stream handle along with other information. For example, an entire meta-content stream may be requested, in which case a suitable representation of a list of all catalog metadata nodes will be returned. Catalog metadata at a given index may be requested, in which case a suitable representation of a single catalog metadata node will be returned. Catalog metadata within a given index range may be requested, in which case a suitable representation of a list encompassing multiple catalog metadata nodes will be returned. Catalog metadata at a given normalized time or time range may be requested, in which case the stream interface 325 may access the correlation engine 327 which may compute an equivalent index or index range with respect to the current meta-content stream based on a normalized time for the main instance of the primary content, resulting in the system returning a suitable representation of a list encompassing multiple catalog metadata nodes.

In the case of requests where more than one catalog metadata node is returned, the request must also indicate if the returned content is expected all at once, synchronized in time as a pushed event (delivering only on-time nodes), or synchronized in time as a pulled event (delivering only on-time nodes).

The stream interface 325 may also handle read requests where more than one, or potentially all, meta-content streams related to a primary content are required. In this case, the stream interface 325 receives a request that indicates the primary content identifier and the domain types of meta-content streams desired, along with the return mode. This return mode can be all at once, synchronized in time as a pushed event (delivering only on-time nodes), synchronized in time as a pulled event (delivering only on-time nodes) or synchronized in space (delivering only nodes physically near the client). The stream interface 325 will also receive, as part of the request, an indication as to whether the entire meta-content streams are sought or the time interval or intervals where information synchronized from multiple streams is desired. The stream interface 325 will process these requests through the correlation engine 327 which aggregates the requested data according to the specified parameters and provides it back to the stream interface 325 to be processed by any of the requesting clients.

Figure 5:
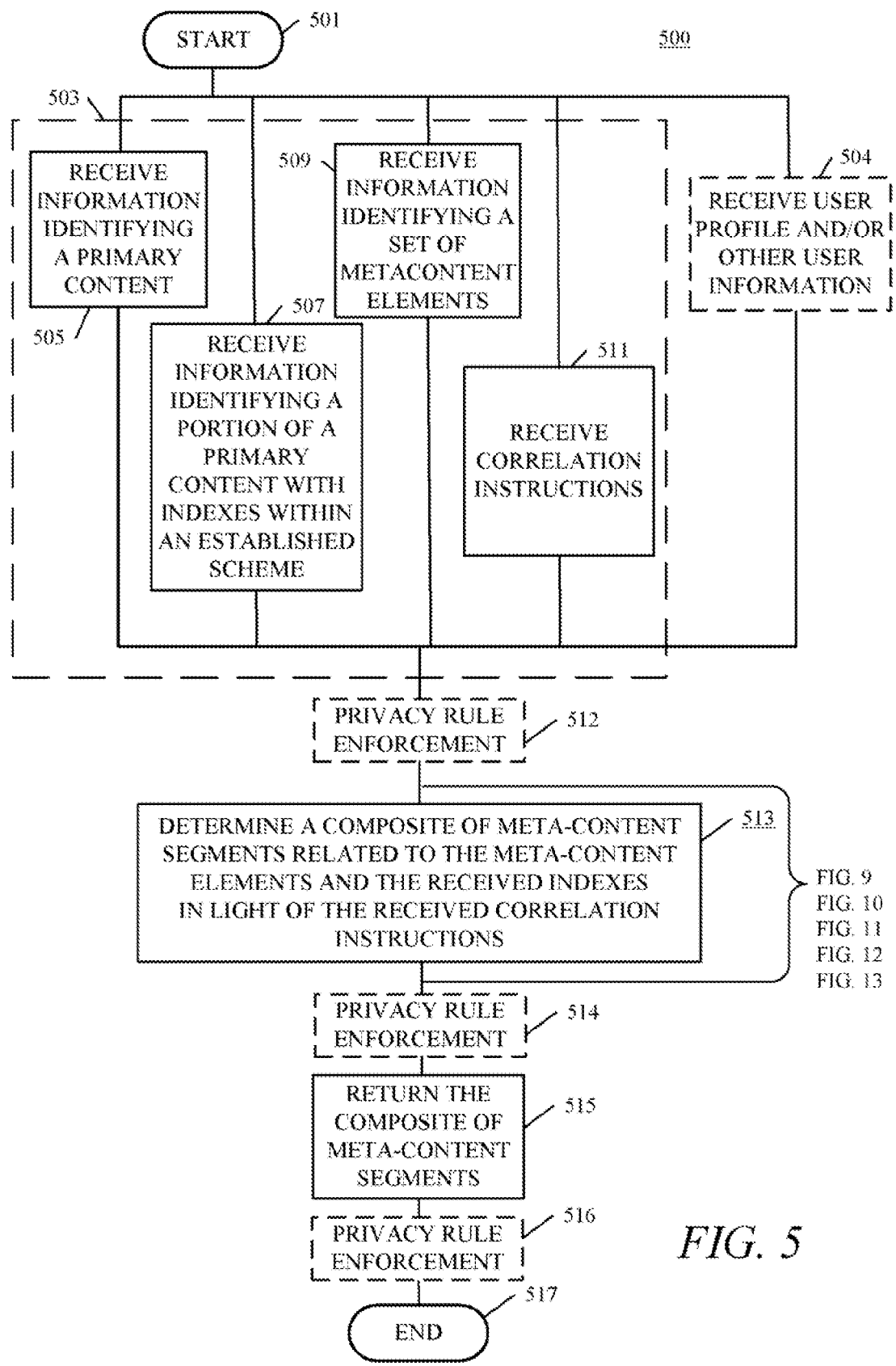
FIG. 5 is a flow chart diagram illustrating an example high level operation of a correlation engine and points of privacy rule enforcement in accordance with the various embodiments.

FIG. 5 provides a method of operation 500 of the correlation engine. The method of operation 500 as shown, begins in 501 were the correlation engine may receive a request 503 from a client application that interacts with the correlation engine to obtain results related to primary content. The request 503 may also be related to meta-content elements, or may be for the purpose of obtaining information related to the meta-content elements themselves. The request 503 includes correlation instructions 511, and may also include information identifying primary content 505, information identifying a portion of the primary content including indexes having an established scheme 507, and/or information identifying a set of meta-content elements 509. In other words the correlation engine will receive correlation instructions 511 and possibly other information identifying content or meta-content, and possibly providing index information. As shown in block 513, the correlation engine may determine a composite of meta-content segments related to the meta-content elements, and any received index information, based on the received correlation instructions 511. The correlation engine will then return the composite meta-content segments at 515 which ends the method as shown in block 517.

Block 513 represents the determination performed by the correlation engine and may include any of a variety of determinations based on various correlation instructions received in the request 503. Examples of such determinations are provided in FIG. 9 through FIG. 13 which are discussed below.

The privacy manager may intercept the request 503, and take action required to enforce privacy rules related to any primary content or meta-content that is involved in the request 503. The privacy manager may obtain user profile or other user information such as user history, as shown in 504. The privacy manager may enforce privacy rules at one or more points in the correlation process as indicated by privacy rule enforcement points 512, 514 and 516. That is, the privacy manager may prevent performance of a correlation, may exclude from a correlation any meta-content elements containing privacy restricted items, may exclude meta-content items from a correlation, may send an alert regarding access denial or privacy violations, or may delete or restrict access to meta-content items in a correlation result. For example, at privacy rule enforcement point 512, the privacy manager may restrict meta-content elements prior to the correlation determination step 513. Privacy rule enforcement points 514 and 516 involve the privacy manager deleting or restricting access to certain portions of the result of determine step 513, either before or after assembly of the composite meta-content segments 515, respectively.

Figure 6:
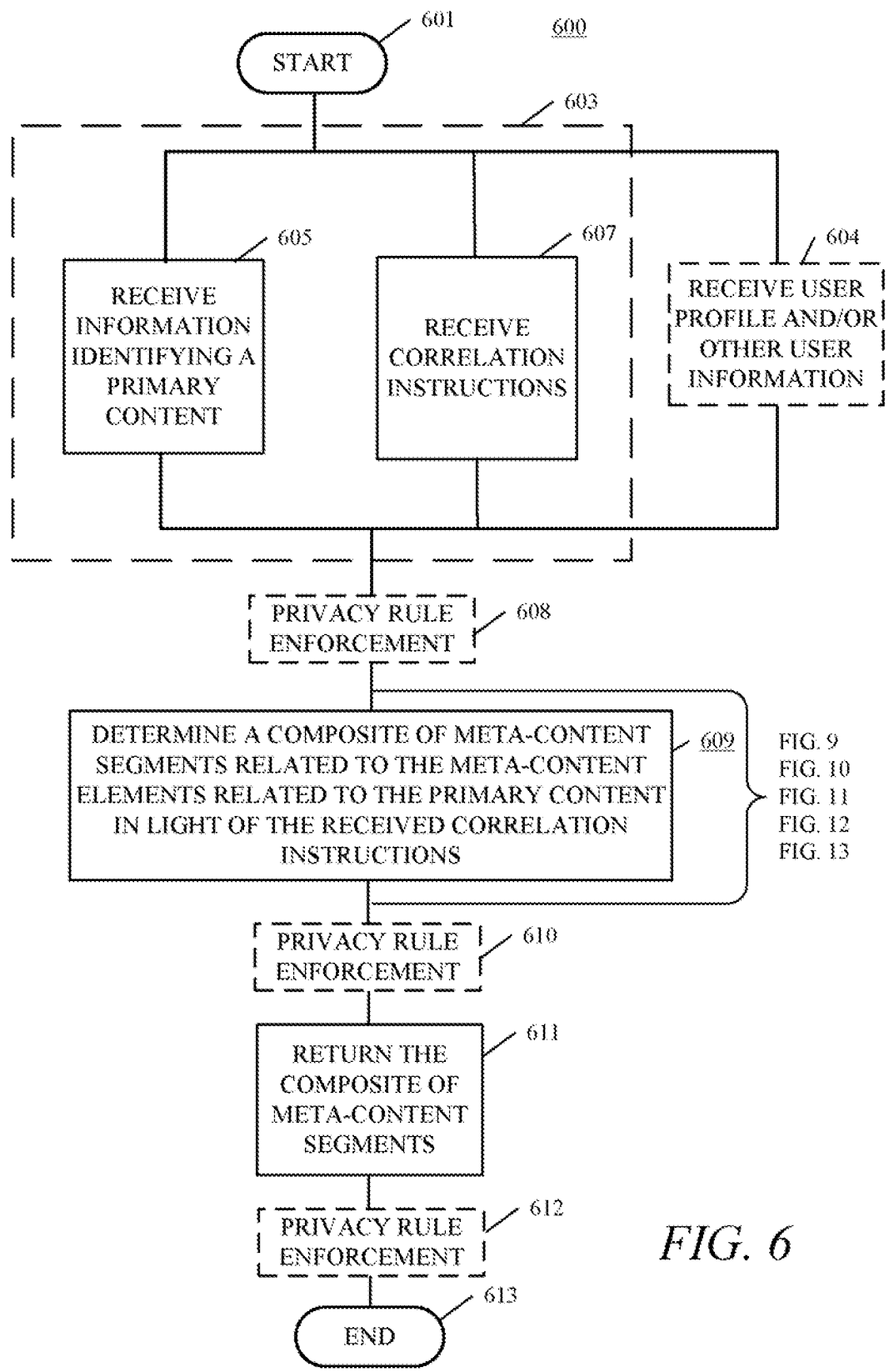
FIG. 6 is flow chart diagram illustrating an example high level operation of a correlation engine and points of privacy rule enforcement in accordance with the various embodiments, where the correlation engine receives correlation instructions along with information identifying a primary content.
Figure 7:
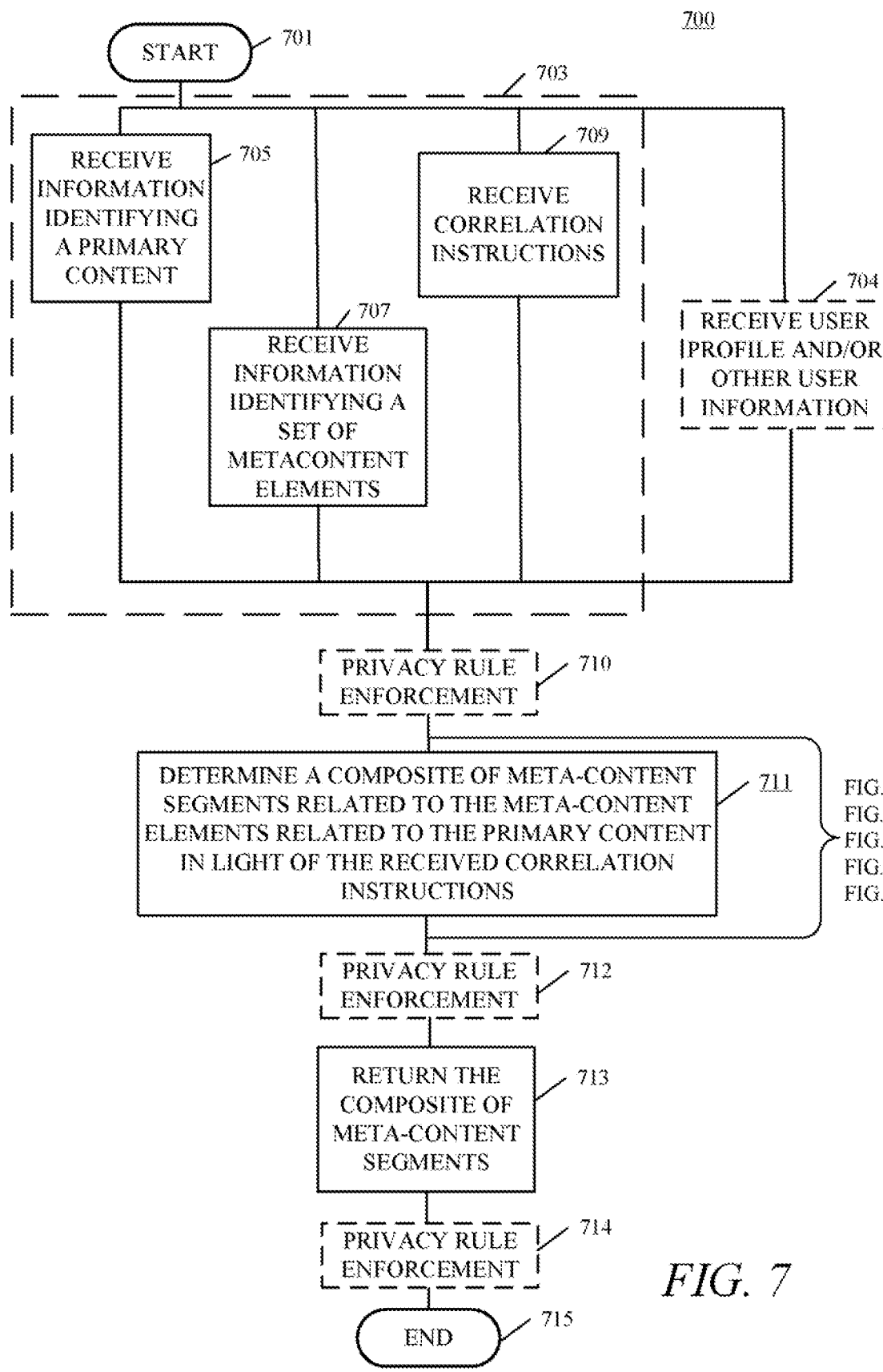
FIG. 7 is a flow chart diagram illustrating an example high level operation of a correlation engine and points of privacy rule enforcement in accordance with the various embodiments, where the correlation engine receives correlation instructions along with information identifying a primary content and information identifying a set of meta-content elements.

FIG. 6 and FIG. 7 are for the purpose of illustrating that the request (FIG. 6, 603 and FIG. 7, 703) may contain less than the information shown in the request 503 illustrated in FIG. 5. For example, in the FIG. 6 method 600 which begins at 601, the request 603 consists of correlation instructions 607 and information identifying a primary content 605. In response to the request 603, the correlation engine will determine the composite meta-content segments related to the primary content based on the received correlation instructions as shown in block 609. The correlation engine returns a composite of meta-content segments in 611 as the result, and the process ends at block 613. The method 600 also includes privacy rule enforcement points 608, 610 and 612. At privacy rule enforcement point 608, the privacy manager may restrict meta-content elements prior to the correlation determination step 609. Privacy rule enforcement points 610 and 612 involve the privacy manager deleting or restricting access to certain portions of the result of determine step 609, either before or after assembly of the composite meta-content segments 611, respectively. The privacy manager may intercept the request 603, and take action required to enforce privacy rules related to any primary content or meta-content that is involved in the request 603. The privacy manager may obtain user profile or other user information such as user history, as shown in 604, which may be used in conjunction with associated privacy rules for privacy rule enforcement.

In FIG. 7, the method 700 begins in 701 and illustrates that a request 703 may include correlation instructions 709, information identifying a primary content 705 and information identifying a set of meta-content elements 707. In some embodiments, a client application will send only correlation instructions to the correlation engine. In other words "request" as used herein may refer to the correlation instructions alone, or may refer to the correlation instructions in combination with other information identifying primary content and/or meta-content. That is, a request is used herein requires at least correlation instructions being sent from a client application to the correlation engine in accordance with the embodiments. In the example method 700, block 711, the correlation engine determines a composite of meta-content segments, related to the meta-content elements, and further related to the primary content based on the correlation instructions 709. The correlation engine returns a composite of meta-content segments in 713 and stops in 715. The method 700 also includes privacy rule enforcement points 710, 712 and 714. At privacy rule enforcement point 710, the privacy manager may restrict meta-content elements prior to the correlation determination step 711. Privacy rule enforcement points 712 and 714 involve the privacy manager deleting or restricting access to certain portions of the result of determine step 711, either before or after assembly of the composite meta-content segments 711, respectively. The privacy manager may intercept the request 703, and take action required to enforce privacy rules related to any primary content or meta-content that is involved in the request 703. The privacy manager may obtain user profile or other user information such as user history, as shown in 704, which may be used in conjunction with associated privacy rules for privacy rule enforcement.

Figure 8:
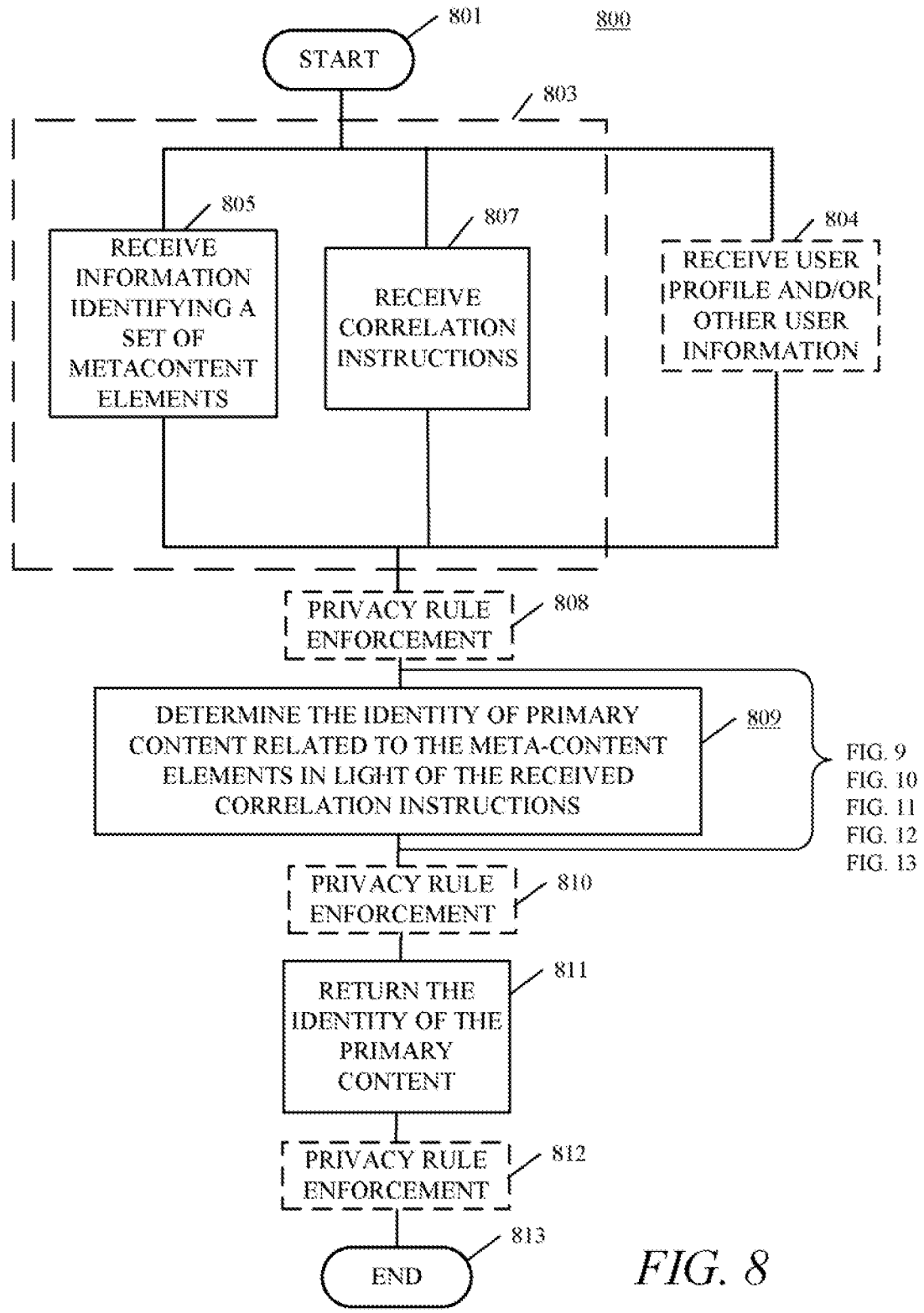
FIG. 8 is a flow chart diagram illustrating an example high level operation of a correlation engine and points of privacy rule enforcement in accordance with the various embodiments, where the correlation engine receives correlation instructions along with information identifying a set of meta-content elements, and returns the identity of the primary content.

FIG. 8 illustrates a method 800, which begins in 801, and where the correlation engine determines the identity of a primary content related to meta-content elements and based on the correlation instructions as shown in block 809. The request 803 includes correlation instructions 807 and information identifying a set of meta-content elements 805. The correlation engine returns the identity of the primary content as shown in block 811 and the method ends at 813 as shown. The method 800 also includes privacy rule enforcement points 808, 810 and 812. At privacy rule enforcement point 808, the privacy manager may restrict identification of primary content prior to the correlation determination step 809. Privacy rule enforcement points 810 and 812 involve the privacy manager deleting or restricting access to certain portions of the result of determine step 609, either before or after execution of the determination step 611, respectively. The privacy manager may intercept the request 803, and take action required to enforce privacy rules related to any primary content or meta-content that is involved in the request 803. The privacy manager may obtain user profile or other user information such as user history, as shown in 804, which may be used in conjunction with associated privacy rules for privacy rule enforcement.

Figure 9:
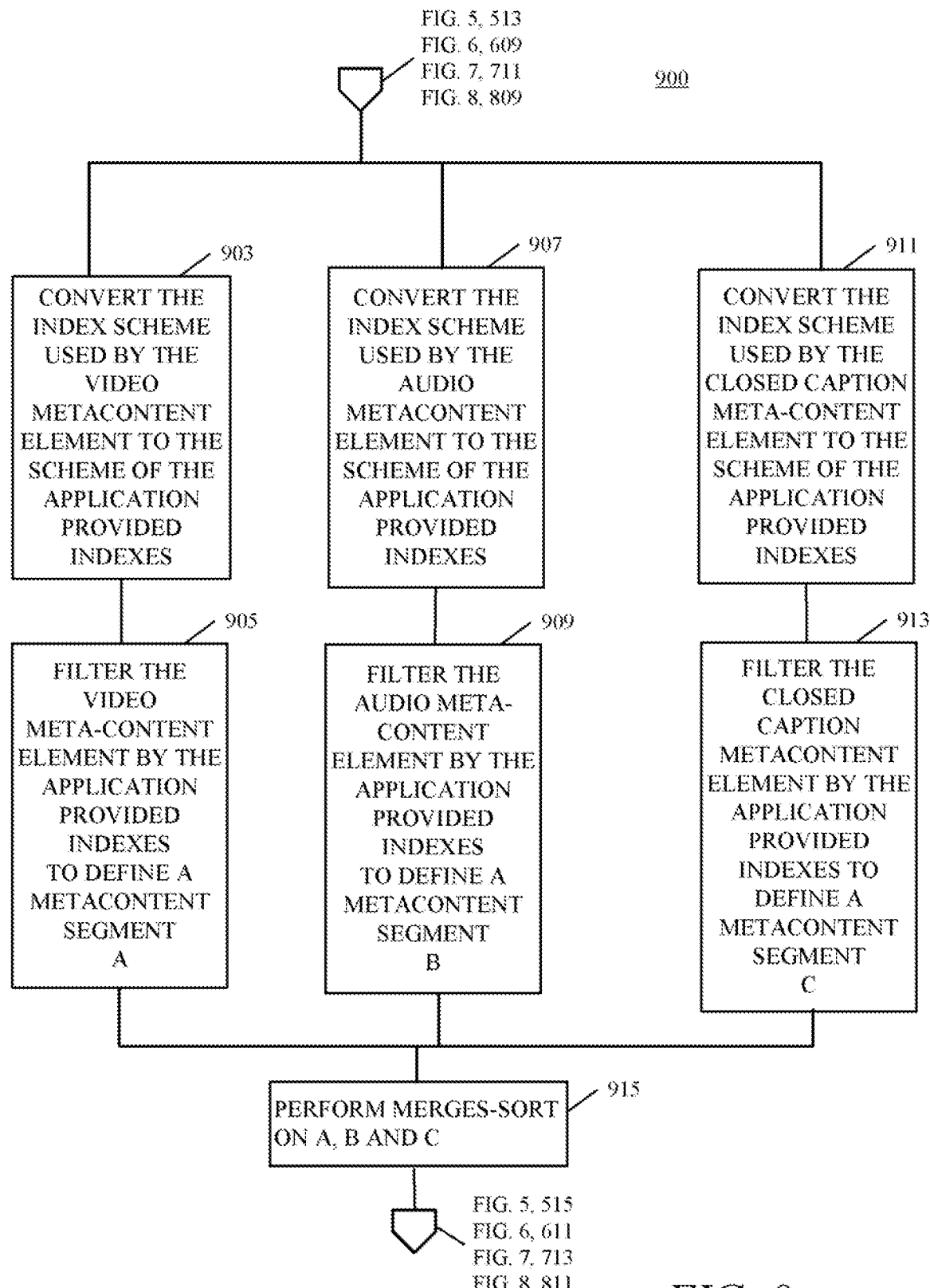
FIG. 9 is a detailed example of the determine step as shown in FIG. 5, 513.

FIG. 9 is a flowchart of a method 900 that is an example of the determine step of FIG. 5, 513; FIG. 6, 609; FIG. 7, 711; and FIG. 8, 809, when the correlation instructions require a time related information aggregation. For example, a client application may request to receive the video, audio and closed caption analysis results, related to a primary content and merged and ordered in time. In block 903, the correlation engine may convert an index scheme used by a video meta-content element to an index scheme provided by the client application in the request. As shown in 905, the correlation engine may filter the video meta-content element using the application provided indexes to define a meta-content segment "A." The correlation engine will also perform operations related to the audio and closed-captioned portions in accordance with the present example. Therefore, in block 907, the correlation engine may convert the index scheme used by the audio meta-content element to the index scheme provided by the client application, and filter the audio meta-content element using the appropriate indexes to define the meta-content segment "B" as shown in block 909.

The correlation engine will perform similar operations on the close caption indexing as shown in block 911, and perform appropriate filtering on the closed-captioned meta-content element as shown in block 913 to define a meta-content segment "C." As shown in block 915, the correlation engine may perform a merges-sort operation on meta-content segments A, B and C. The method may then return to any of FIG. 5, 515; FIG. 6, 611; FIG. 7, 713 or FIG. 8, 811 as appropriate when applicable.

Figure 10:
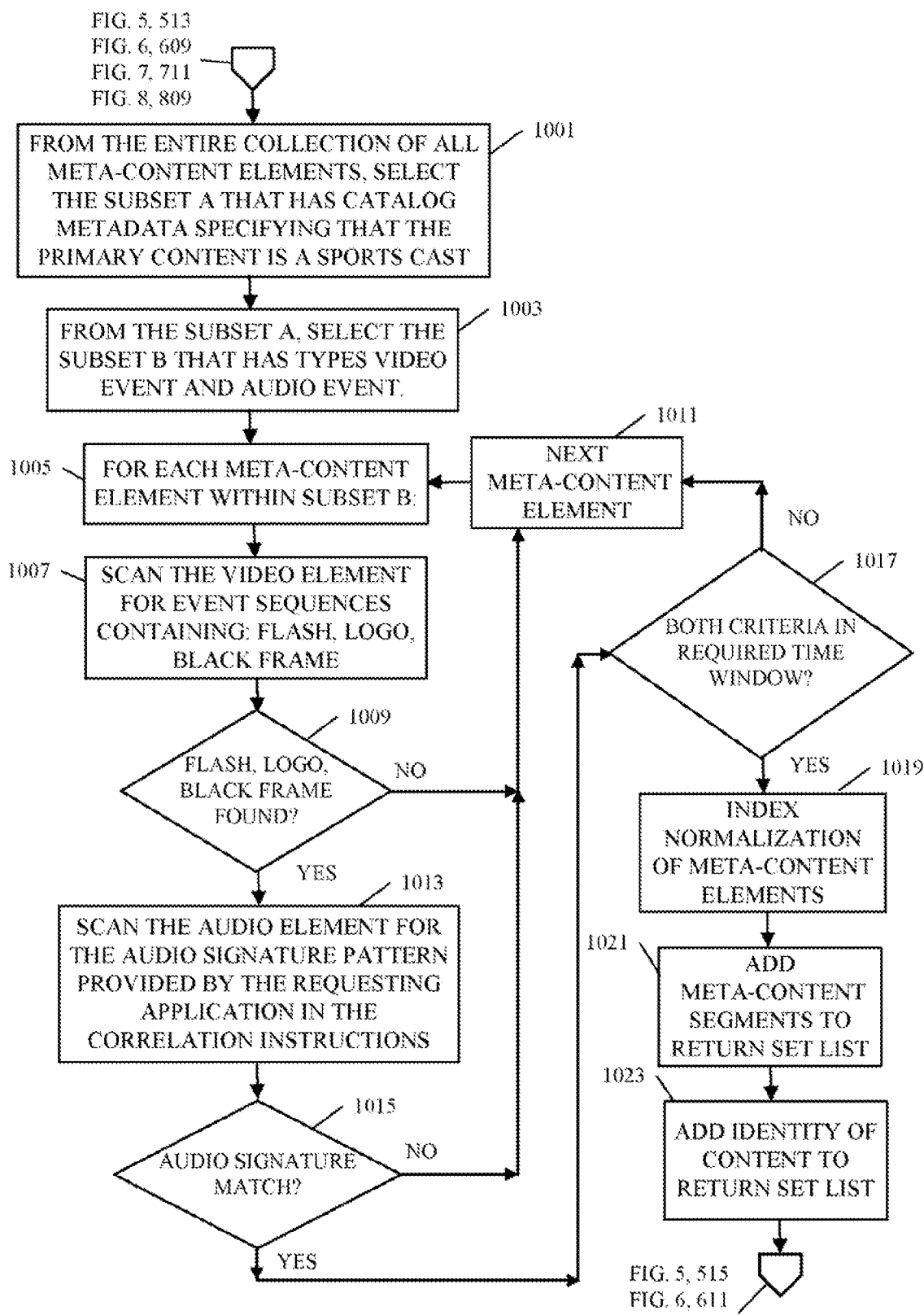
FIG. 10 is a detailed example of the determine step as shown in FIG. 5, 513.

FIG. 10 provides an example of the determine step (FIG. 5, 513; FIG. 6, 609; FIG. 7, 711 or FIG. 8, 809) when the correlation instructions require search against items within meta-content elements. For example, the client application may request to search all video analysis results with a video event sequence of flash frame, logo detection, and/or black frame in that particular order. The application request may further require a search for audio events where the audio event is a station identifier musical signature. In one example, the musical signature may be indicative of a change of scene for replays in sports or commercial breaks. Therefore in 1001, the correlation engine may select a subset of meta-content elements "A," that has catalog metadata specifying that the primary content is a sportscast. As shown in 1003, the correlation engine may perform a filtering operation by selecting a subset "B," from the subset A, that has meta-content element types including video events and audio events. The correlation engine may then perform a loop operation related to the subset B as illustrated beginning in block 1005. That is, the correlation engine may scan the video element for event sequences containing the flash, logo, and black frame as shown in 1007. If the required event sequences are found as shown in 1009, the correlation engine may perform the next operation of scanning the audio elements for the audio signature pattern provided by the requesting application as defined in the correlation instructions. This operation is illustrated by block 1013. If an audio signature match is found as shown in block 1015, the correlation engine may determine whether both criteria are within a required time window as shown in block 1017. If any of the criteria as defined by the decision blocks 1009, 1015, or 1017 are not found, the correlation engine may jump to the next meta-content element as shown in block 1011 of the loop operation. However, if all criteria are met at the decision block 1017, then the correlation engine may perform an index normalization of the meta-content elements as illustrated in block 1019. The correlation engine may then add the meta-content segments to the return set list is illustrated in block 1021, and add the identity of the primary content to the return set list as illustrated in block 1023. The method then may continue and return to any of FIG. 5, 515; FIG. 6, 611; FIG. 7, 713 or FIG. 8, 811 as appropriate when applicable.

Figure 11:
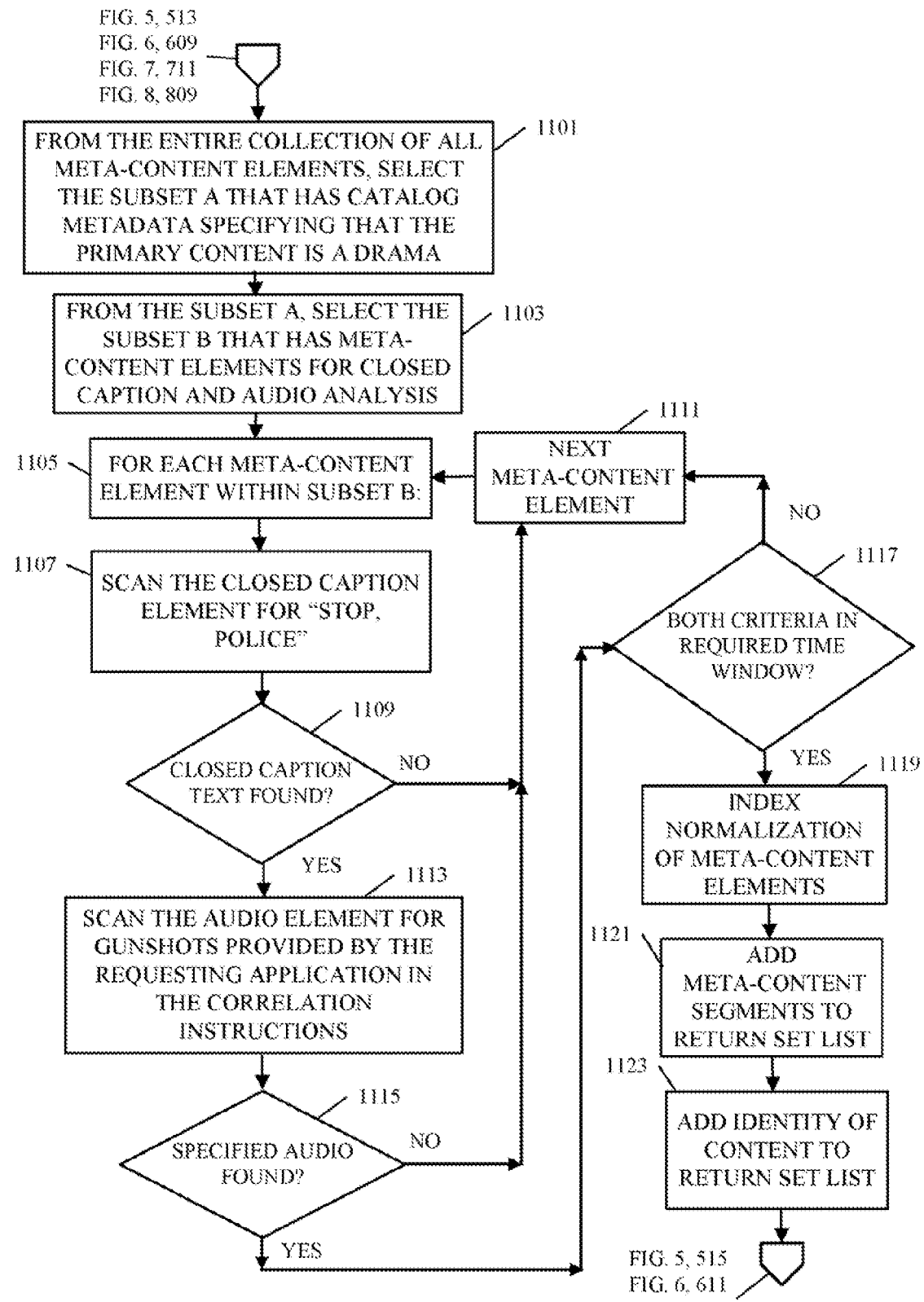
FIG. 11 is a detailed example of the determine step as shown in FIG. 5, 513.

FIG. 11 provides an example of the determine step (FIG. 5, 513; FIG. 6, 609; FIG. 7, 711 or FIG. 8, 809) when the correlation instructions state that a search against items within the meta-content elements is required. For example, a search requested by the application may require searching closed-captioned analysis results containing the words "stop, police" near in time to audio analysis results containing gunshots related to drama shows. Therefore, in 1101, the correlation may engine may select from the entire collection of all meta-content elements subset "A" that has catalog metadata specifying that the primary content is a drama. As shown in 1103, the correlation engine may filter subset A to select a subset "B" that has meta-content elements for closed-caption and audio analysis. The correlation engine may then enter a loop operation related to the meta-content element subset B as shown starting in block 1105. That is, the correlation engine may scan the closed-caption meta-content elements for the required words "stop, police" as shown in 1107. If the required closed-caption text is found as shown in decision block 1109, the correlation engine may scan the audio meta-content element for the required gunshot audio signature as provided by the requesting application, and defined in the correlation instructions, as shown in block 1113. If the specified audio is found as illustrated in decision block 1115, the correlation engine may check that both criteria occur within a required time window as illustrated by decision block 1117. If any of the criteria required in decision blocks 1109, 1115, or 1117 are not found, the correlation engine will jump to the next meta-content element as shown in block 1111 of the loop operation. Assuming that all the criteria are found and satisfied as required by decision block 1117, the correlation engine may perform an index normalization of the meta-content elements as shown in block 1119, and add the meta-content segments to the return set list as illustrated in block 1121. The correlation engine may add the identity of the primary content to the return set list as shown in block 1123. The method then may continue and return to any of FIG. 5, 515; FIG. 6, 611; FIG. 7, 713 or FIG. 8, 811 as appropriate when applicable.

Figure 12:
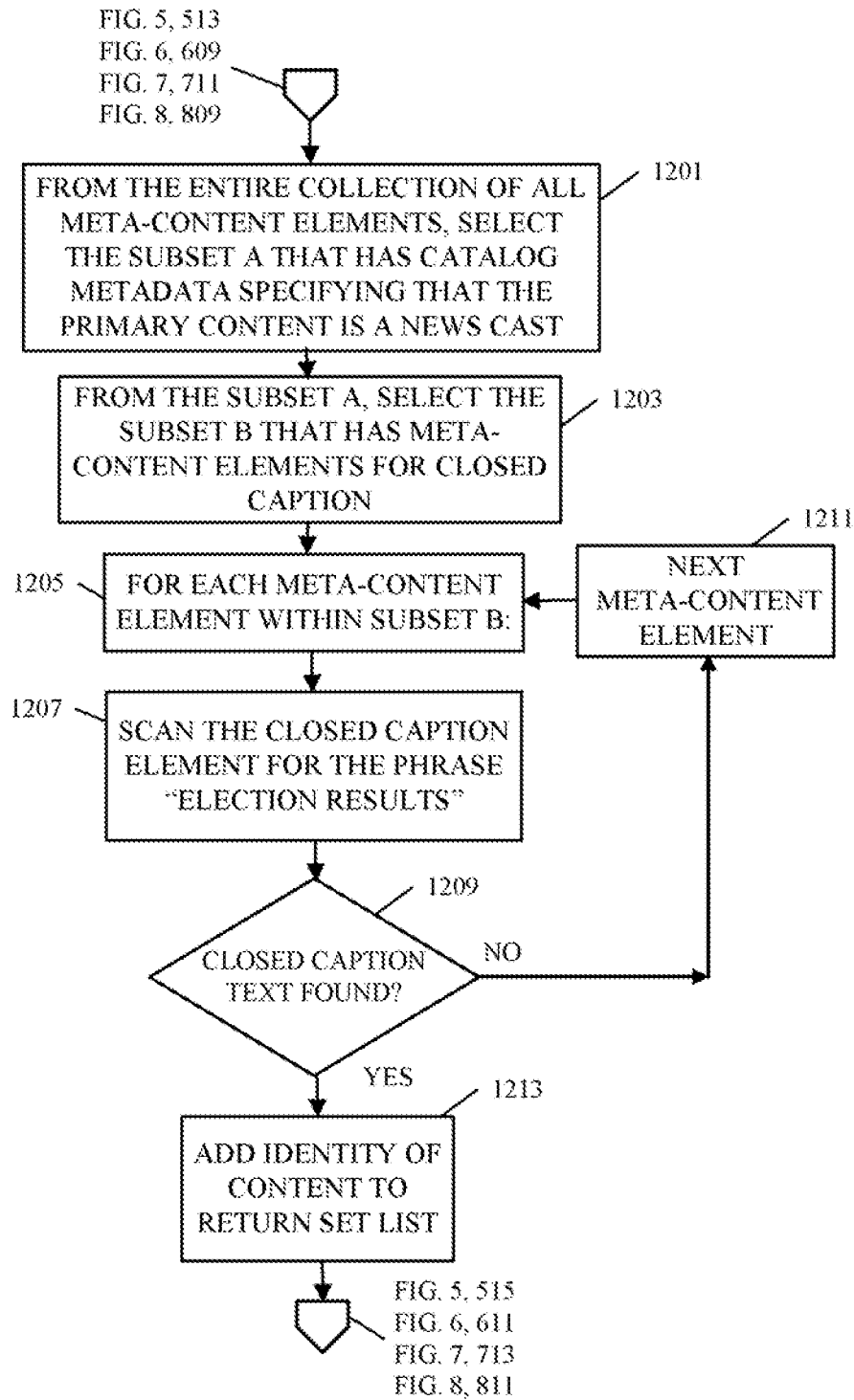
FIG. 12 is a detailed example of the determine step as shown in FIG. 5, 513.

FIG. 12 illustrates an example of the determine step (FIG. 5, 513; FIG. 6, 609; FIG. 7, 711 or FIG. 8, 809) when the correlation instructions state that a search against items within meta-content elements should search all closed-caption analysis results related to a newscast containing the words "election results." For example, in 1201, the correlation engine may create a subset "A" of all meta-content elements that have catalog metadata specifying that the primary content is a news cast. The correlation engine may then perform the filtering operation as illustrated in block 1203. In block 1203, the correlation engine may select a subset "B" that has meta-content elements for closed captioning. The correlation engine may then perform a loop operation related to the meta-content elements within subset "B" as illustrated beginning in block 1205. As shown in block 1207, the correlation engine may scan for closed-captioned elements that contain the phrase "election results." If the closed-captioned text is found, as illustrated in decision block 1209, the correlation engine may add the identity of the primary content to the return set list as illustrated in block 1213. Otherwise, the method proceeds to the next meta-content element as shown in 1211. After block 1213, the method may continue and return to any of FIG. 5, 515; FIG. 6, 611; FIG. 7, 713 or FIG. 8, 811 as appropriate when applicable.

Figure 13:
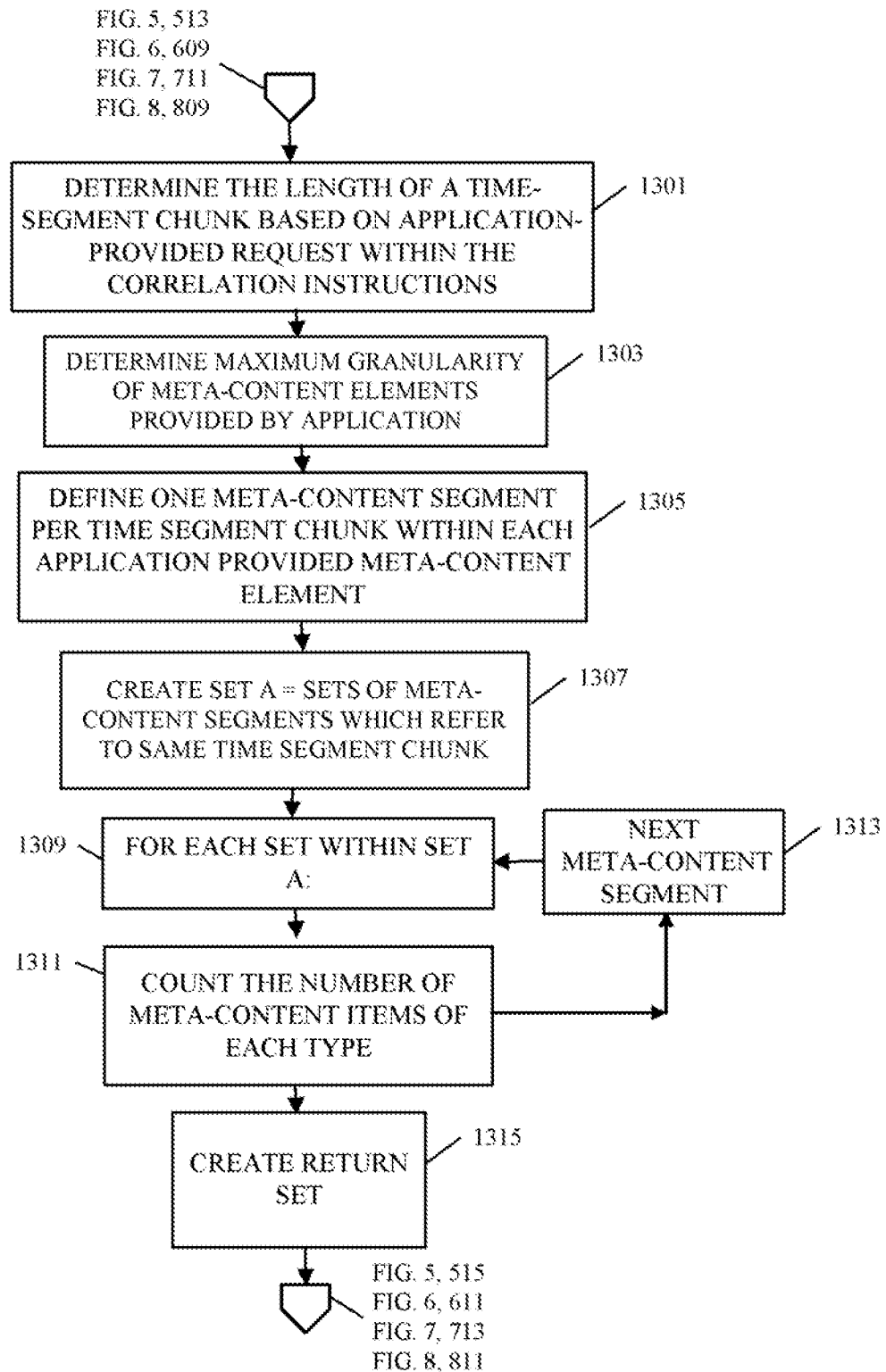
FIG. 13 is a detailed example of the determine step as shown in FIG. 5, 513.

FIG. 13 provides an example of the determine step (FIG. 5, 513; FIG. 6, 609; FIG. 7, 711 or FIG. 8, 809) when the correlation instructions require the construction of a "heat map" against either simple counts or complex aggregated statistics of meta-content items within a conjoint grouping of meta-content elements. For example, the application may request type-keyed counts of meta-content items versus time-segmented chunks of primary content. Therefore, in block 1301 the correlation engine may determine the length of a time-segmented chunk based on application provided correlation instructions sent in the request. In 1303, the correlation engine may determine the maximum granularity of meta-content elements as defined in the request provided by the application. In block 1305, the correlation engine may define one meta-content segment per time segment chunk within each application provided meta-content element. In 1307, the correlation engine may create a set "A," which includes all meta-content segments which refer to the same time segment chunk. The correlation engine may then enter a loop operation with respect to the defined set A as shown beginning in 1309. The correlation engine, as shown in block 1311, may count the number of meta-content items of each type, and create a return set as shown in block 1315. The correlation engine will perform the count operation for each meta-content element in the loop operation as illustrated by block 1313. The method then may continue and return to any of FIG. 5, 515; FIG. 6, 611; FIG. 7, 713 or FIG. 8, 811 as appropriate when applicable.

Figure 14:
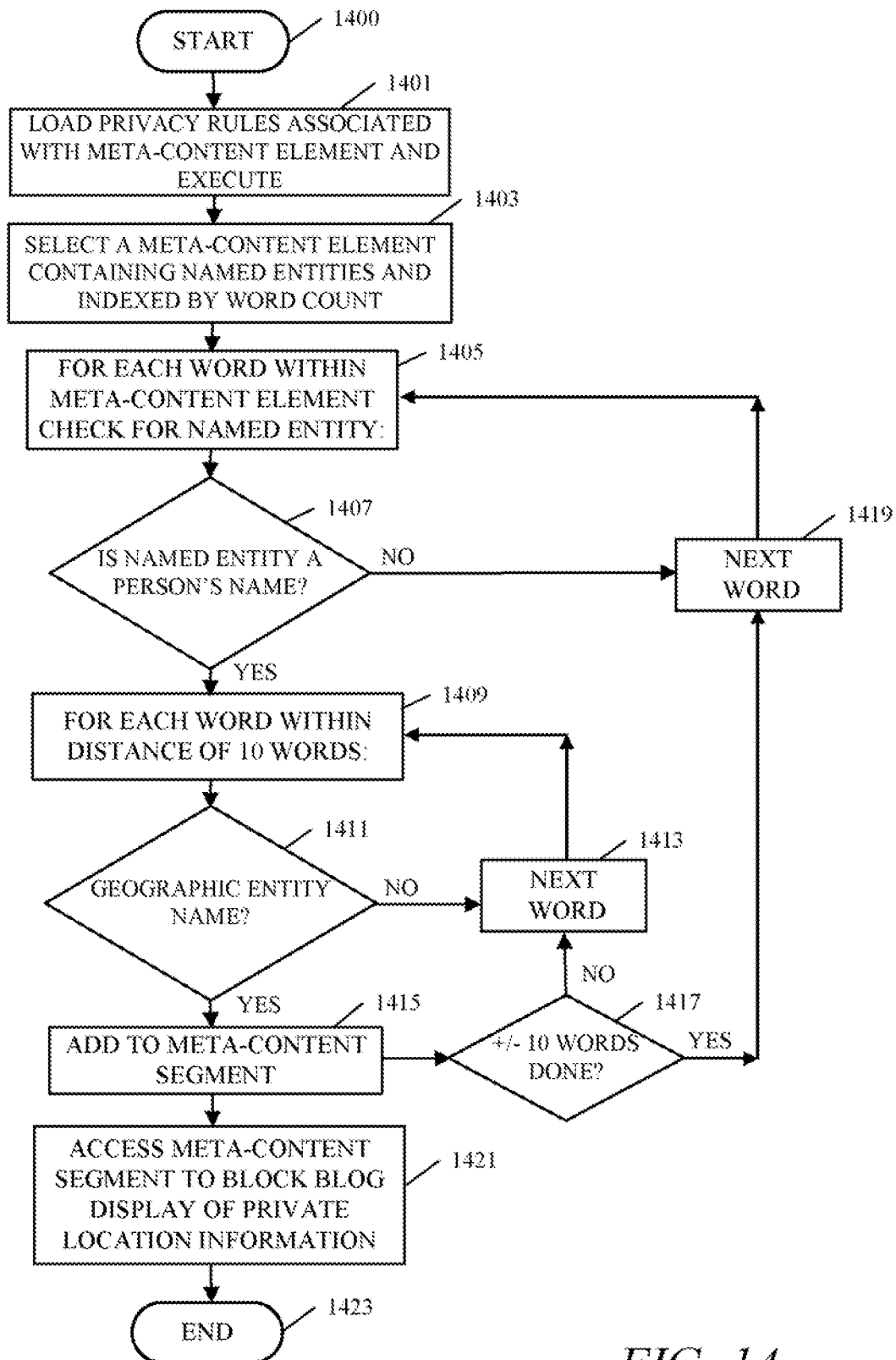
FIG. 14 is a flowchart diagram illustrating an example of privacy rule enforcement procedures that prevent display of geographic information related to a particular person from appearing in a web blog.

FIG. 14 through FIG. 18 provide examples of how the privacy manager may establish criteria for enforcement of privacy rules, at the various privacy rule enforcement points illustrated in FIG. 5 through FIG. 8. The privacy manager prevents co-occurrence of meta-content items and may use various criteria such as, but not limited to, a threshold distance between meta-content items. This threshold distance may be based on a temporal separation such as events occurring within a certain number of seconds, number of frames apart such as video frames, distance apart as measured by number of images or number of characters, difference in context such as number of scenes in a video, or any other suitable criteria defined or required by predetermined privacy rules associated with a primary content and/or associated meta-content elements. The privacy manager operation is best understood by way of the following examples. FIG. 14 is a flowchart diagram illustrating an example of privacy rule enforcement procedures that prevent display of geographic information related to a particular person from appearing in a web blog. The process of FIG. 14 begins at block 1400, which begins when the privacy manager intercepts correlations instructions. This may be accomplished by the privacy manager intercepting a correlation request.

In 1401 the privacy manager loads privacy rules associated with a meta-content element and executes the privacy rules. The meta-content element may have the privacy rules embedded in a meta-content segment of the meta-content element. In some embodiments, the privacy manager may obtain the privacy rules from a user profile. The privacy rules may be obtained at any of the privacy enforcement points illustrated in FIG. 5 through FIG. 8, but is triggered by the interception of a request as shown in FIG. 5 through FIG. 8. That is, the privacy manager intercepts the correlation request. In FIG. 14, the privacy rules prevent disclosure of geographic location information related to a person's whereabouts, in a web blog entry. In this example, the privacy manager creates a reference meta-content segment that is used, for example, as a comparator to prevent logging of certain information. In 1403, meta-content elements containing named entities are selected and indexed by word count. It should be understood that block 1403 may be a privacy rule process block, or may be a correlation process block, depending on where the privacy manager acts on a privacy rule enforcement point. More specifically, if the privacy manager acts on the result of a performed correlation, the privacy manager will monitor the correlation results to determine which meta-content items must be deleted or restricted. In the example of FIG. 14, it is assumed that the privacy manager creates a reference meta-content segment that is used to determine which location information to block from the blog. Therefore, process block 1403 may be performed by the privacy manager. In 1405, a loop operation begins in which the privacy manager scours the meta-content element for named entities. In decision block 1407, if a named entity is a person's name, another loop operation begins at block 1409. If the named entity is not a person's name, the next word is selected in 1419 and checked. At 1409, the loop operation checks ten words distance from the name to determine if any geographic entity names occur as shown in decision block 1411. If not, the next word is checked as shown in 1413. If a geographic entity name is found in decision block 1411, it is added to a meta-content segment in 1415. The loop operation continues until ten words from the front and back of the person's name is checked as shown in decision block 1417. The loop operation then returns to the next word in the larger loop operation as in blocks 1419 and 1405, until the entire meta-content element has been checked. In block 1415, after completion of the looping operations, a reference meta-content segment is generated. In 1421, the privacy manager may access the generated meta-content segment, and compare it to correlation results, to determine what location information to block from display, as shown in 1421. The process ends in 1423.

Figure 15:
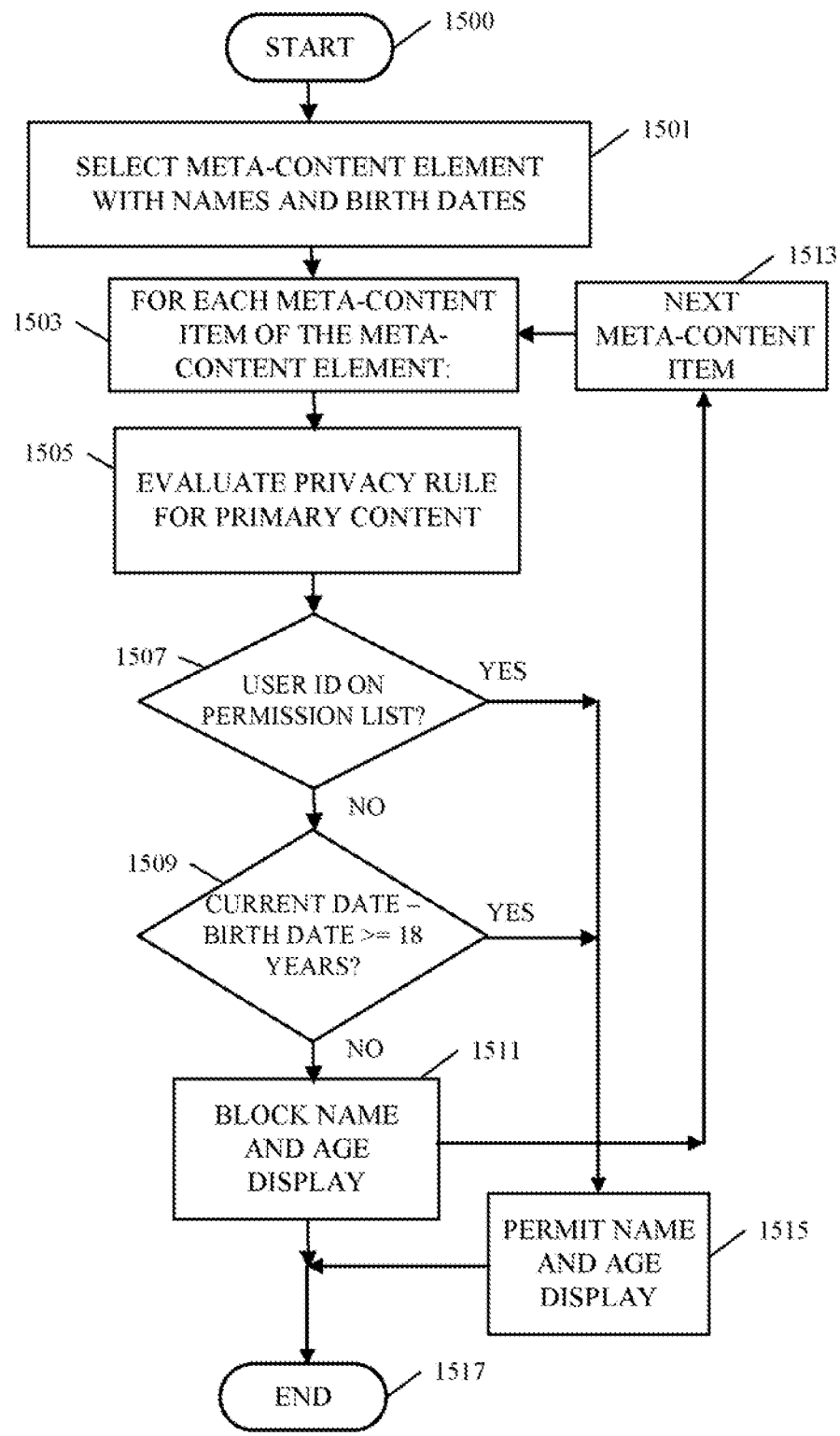
FIG. 15 is a flowchart diagram illustrating an example of privacy rule enforcement procedures that prevent access to name and age information for persons depicted in a home video.

FIG. 15 is a flowchart diagram illustrating an example of privacy rule enforcement procedures that prevent access to name and age information for persons depicted in a home video. The process begins in 1500 where the privacy manager has intercepted a request for the privacy protected information. The privacy protected information may be any information desired to be kept private. For example, privacy protected information may be protected health information or other protected information as defined or specified by applicable laws. In another example, privacy protected information may be personal private information such as social security number, date of birth, home address, home phone number, or other information etc. In another example, privacy protected information may be information related to use of the Internet, such as browsing or search history, user names, etc. That is, the privacy protected information may be any information that is specified as private by the privacy rules. The privacy manager, according to the applicable privacy rules, can prevent the correlation of information from different sources (or delete certain results, or omit certain meta-content from the correlation process) that would create results that could reveal information not obtainable without the correlation. In 1501, a meta-content element with names and birth dates are selected. A loop operation begins in 1503 in which each meta-content item of the meta-content element is checked. The privacy rule associated with the primary content is evaluated for each meta-content item as shown in 1505. If a user identification associated with an identified name is on a permission list as shown in decision block 1507, the name and age of the person is permitted to be displayed as shown in block 1515. If not, the person's age is checked in decision block 1509. If the person is over eighteen years of age, their name and age is permitted to be displayed in 1515. If not, their name and age are blocked from display as shown in 1511. The looping operating continues to the next meta-content item as shown in block 1513. The process ends in 1517.

Figure 16:
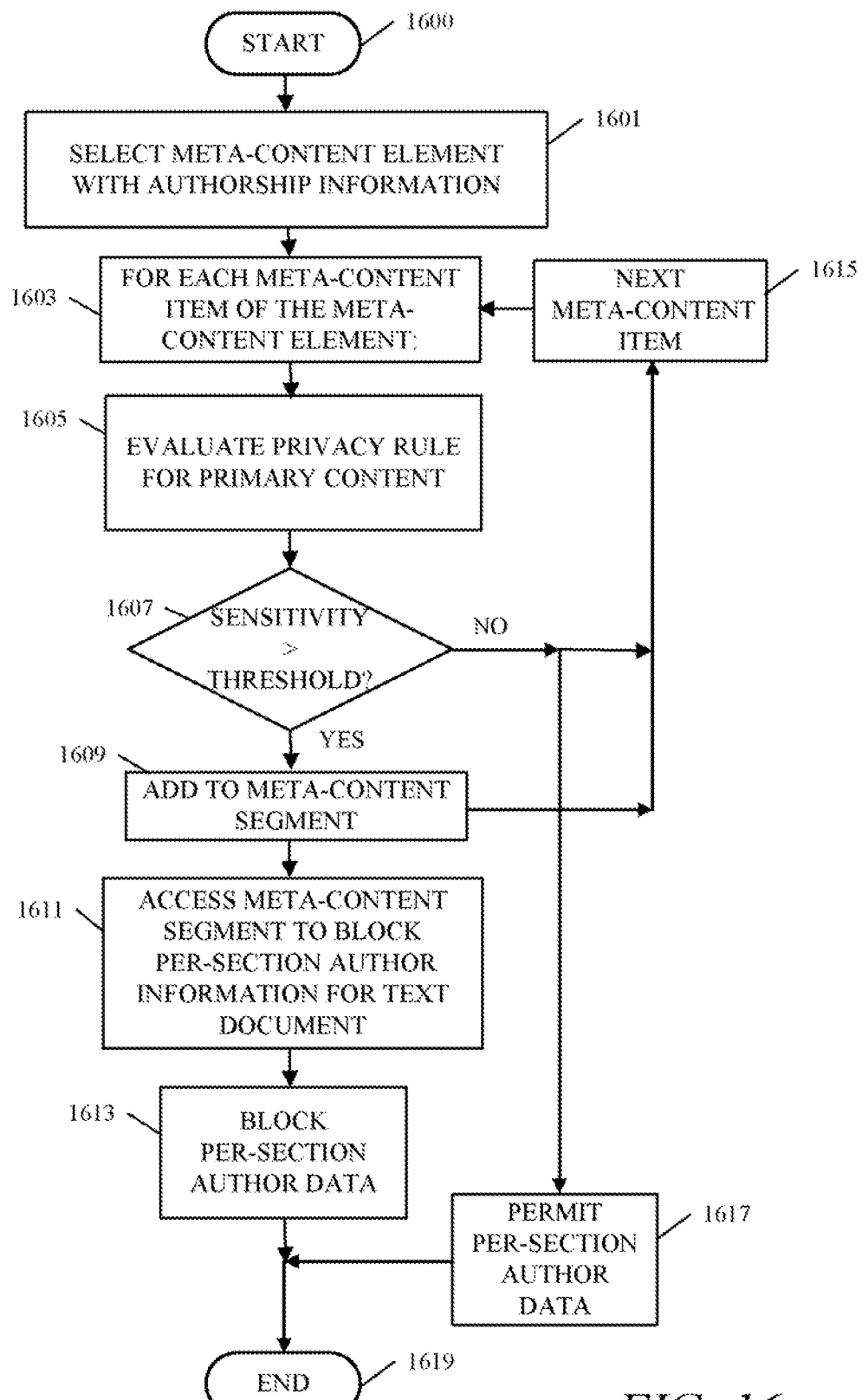
FIG. 16 is a flowchart diagram illustrating an example of privacy rule enforcement procedures that prevent access to per-section author information related to a document.

FIG. 16 is a flowchart diagram illustrating an example of privacy rule enforcement procedures that prevent access to per-section author information related to a document. The process begins in 1600 when the privacy manager intercepts a request for authorship information. A meta-content element having authorship information is selected in block 1601. A loop operation begins in 1603 that checks each meta-content item of the meta-content element. The privacy rule for the primary content is evaluated for each meta-content item as shown in 1605. The sensitivity of the primary content, specified by the privacy rules, is checked against a threshold value as shown in decision block 1607, and, if the threshold is exceeded, the meta-content item is added to a meta-content segment as shown in 1609. If the threshold is not exceeded, the per-section author data is permitted to be accessed in 1617, and the loop operation continues to the next meta-content item as shown in 1615. After the reference meta-content segment is generated by the loop operation as shown in 1609, the privacy manager accesses the reference segment in 1611 and accordingly blocks access to the per-section author data as shown in 1613. The process ends at 1619 as shown.

Figure 17:
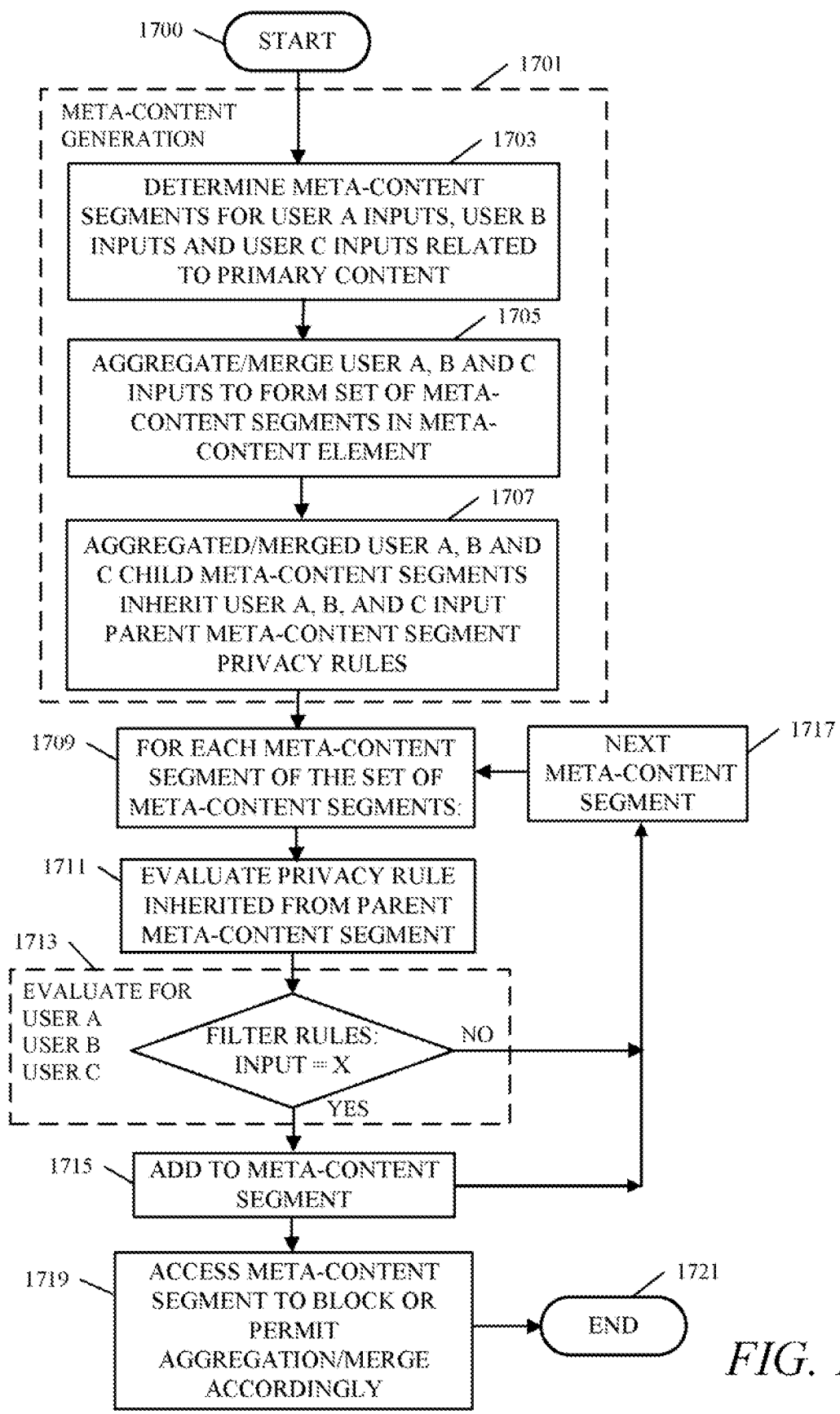
FIG. 17 is a flowchart diagram illustrating an example of privacy rule enforcement procedures that prevent aggregation of certain information, and inheritance of primary content privacy rules by meta-content.

FIG. 17 is a flowchart diagram illustrating an example of privacy rule enforcement procedures that prevent aggregation of certain information, and inheritance of primary content privacy rules by meta-content. The process begins at 1700, where a user or client application, or a server generates meta-content by performing an aggregation operation which alerts the privacy manager. The privacy manager is alerted by the request for the privacy protected content which it intercepts. The FIG. 17 process illustrates a privacy rule enforcement point that occurs after meta-content generation 1701 which is, in this example, an aggregation. That is, the meta-content generation 1701 determines meta-content segments for inputs from three users, "A," "B," and "C" as shown in 1703. The three user inputs are aggregated or merged in 1705 to form a set of meta-content segments in a meta-content element. As shown in 1707, the aggregated meta-content segments inherit the privacy rules from their parent (i.e. source) meta-content segments. A privacy enforcement loop operation begins as shown in 1709 for each meta-content segment of the set. In 1711 the privacy rules inherited from the parent meta-content segments are evaluated for each segment. Therefore, for simplicity, assuming a filter rule as shown in decision block 1713, the appropriate rule is evaluated for each user A, B, and C. The filter output is added to the reference meta-content segment in 1715 if the filter criterion is met. Otherwise, the next meta-content segment is evaluated in 1717 in continuation of the loop operation. The privacy manager then accesses the reference meta-content segment to either permit or block access to the segments as shown in 1719. That is, the privacy manager requires that the privacy rules for each user input are enforced appropriately in the aggregated meta-content segments generated by the meta-content generation 1701, which aggregates the meta-content. The process ends at 1721 as shown.

Figure 18:
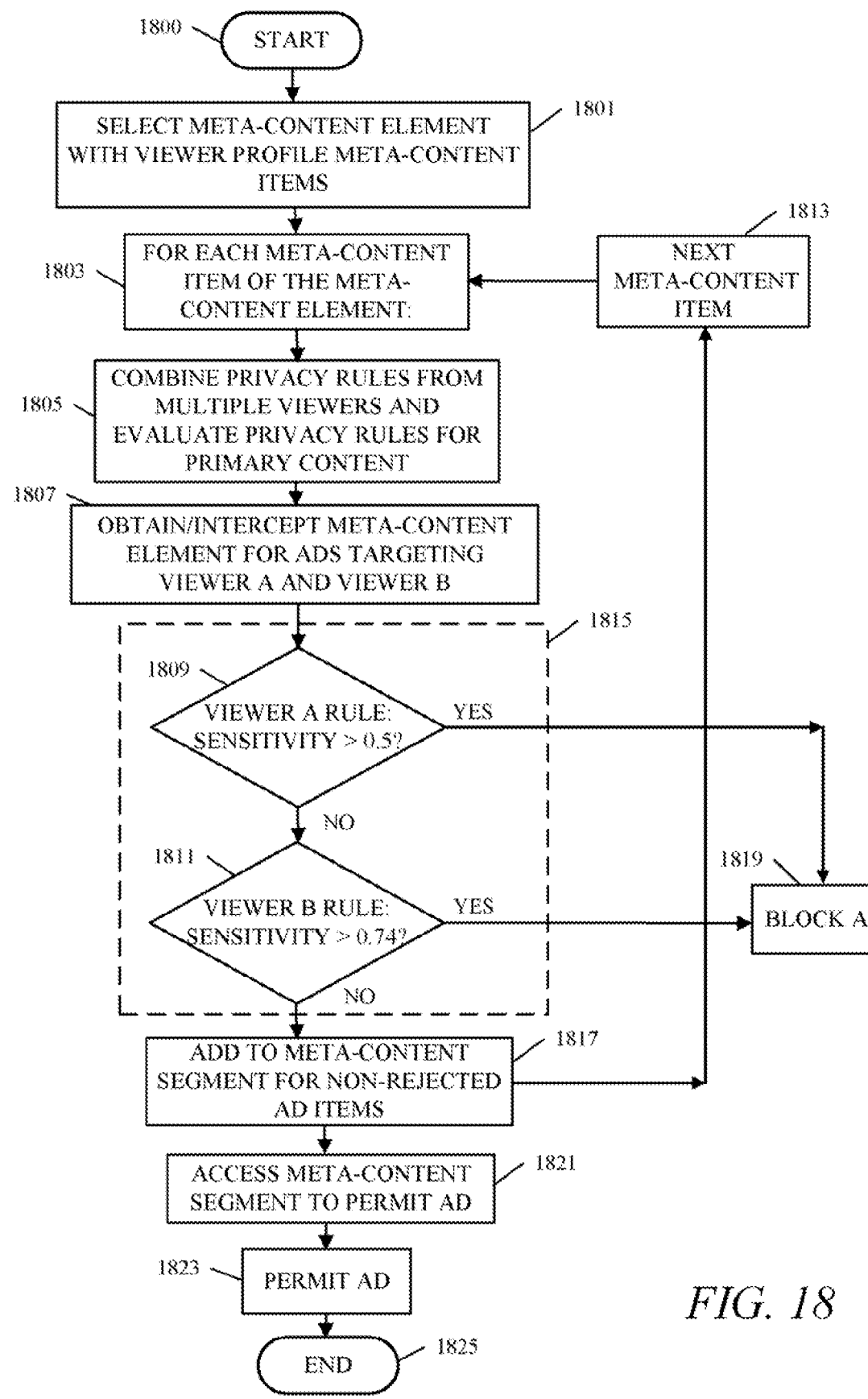
FIG. 18 is a flowchart diagram illustrating an example of privacy rule enforcement procedures that prevent display of undesired adverts in a social television context.

FIG. 18 is a flowchart diagram illustrating an example of privacy rule enforcement procedures that prevent display of undesired advertisements in a social television context. The process begins at 1800, where the privacy manager may receive a user or client application request to engage in social television. In the social television context, several users may watch a program and make comments on the content in real time. Targeted advertisements may appear that are targeted to any one of the users engaged in the session. One or more of the users may wish to prevent such targeted advertisements in the social context, for example, to prevent appearance of advertisements that may cause embarrassment. In 1801 a meta-content element is selected that has viewer profile meta-content items. A loop operation begins in 1803 that checks each meta-content item of the meta-content element. In this case, the privacy rules for multiple viewers are combined as shown in 1805. In 1807, the privacy manager must intercept meta-content elements for advertisements targeting one of the multiple viewers. For simplicity, two viewers are used in the example, viewer A and viewer B. The combined privacy rules 1815 require two decision blocks 1809 and 1811. Each viewer specified a sensitivity threshold which blocks a certain type of advertisement from being shown in the social television setting. In other words, some targeted advertisements that the viewers would find embarrassing could be blocked. Because viewer A as a lower sensitivity threshold than viewer B, the two decision blocks 1809 and 1811 can be combined in a serial manner as shown by combined privacy rules 1815. That is, any advertisement that is greater than viewer A's setting will be blocked as shown in 1819. However, if viewer A's setting does not block the advertisement, then viewer B's rule, which is stricter than viewer A's setting, must be evaluated as shown in decision block 1811. Therefore, an advertisement that is acceptable for viewer A, may be blocked by viewer B's criteria in 1819. The non-rejected advertisements may be added to a meta-content segment for non-rejected advertisements as shown in 1817, and the loop operation proceeds to the next meta-content item in block 1813. The privacy manager may access the reference meta-content segment in 1821 to permit advertisements as shown in 1823. The process ends at 1825 which may correspond to the end of the social television session.

Figure 19:
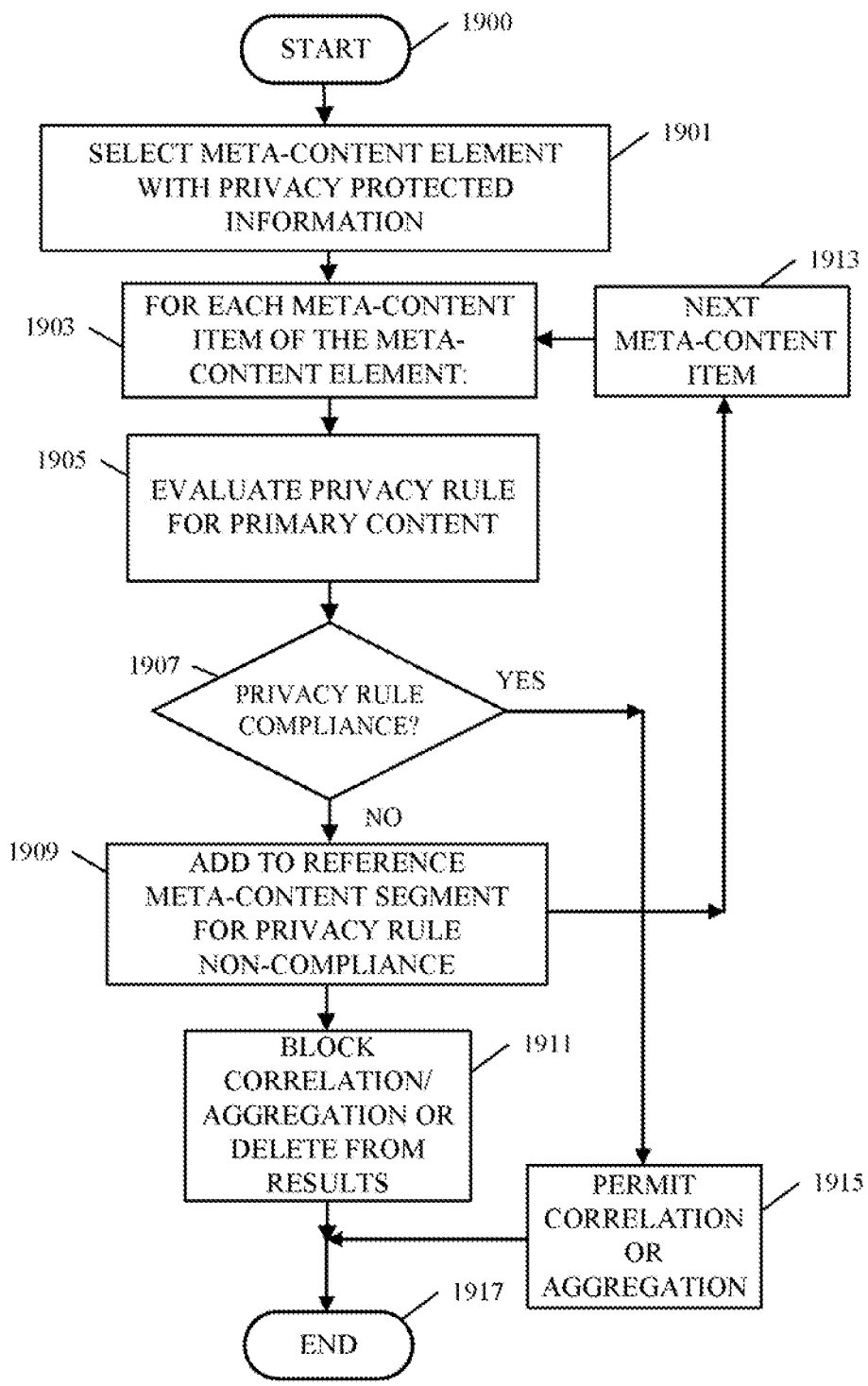
FIG. 19 is a flowchart diagram summarizing operation of a privacy manager in accordance with some embodiments.

FIG. 19 provides a summary of the operation of a privacy manager in accordance with some of the embodiments described above by the various use cases presented. The process begins at 1900 when the privacy manager is invoked by, in some cases, intercepting a request to perform a correlation operation. In 1901, a meta-content element with privacy protected information is selected. A loop operation begins in 1903 which involves checking each meta-content item of the selected meta-content element. For each meta-content item, the privacy rule of the related primary content is evaluated as shown in 1905. If privacy rule compliance is determined in decision block 1907, the request correlation or aggregation may be permitted as shown in 1915. However, if non-compliance with the privacy rules is determined in decision block 1907, a reference meta-content segment is generated composed of the protected meta-content items as shown in 1909. The privacy manager may then use the composed meta-content segment to block correlation and/or aggregation of the protected meta-content items as shown in 1911. This may also involve deleting the correlation or aggregation results. The looping operations continues for each meta-content item as shown in block 1913, and the process ends as shown in block 1917.

The privacy manager and/or access control manager, correlation engine, and also the stream interface may be implemented in various ways. For example, the correlation engine, stream interface and/or access control manager and/or privacy manager may be implemented as software and/or firmware executing on one or more programmable processors, ASICs, DSPs, hardwired logic or combinations thereof. In the example of FIG. 1, the privacy manager 123 may be considered to be software and/or firmware executing on one or more processors of a server. The one or more processors, is operatively coupled to non-volatile, non-transitory memory and the one or more processors may communicate with the memory as required to execute the executable instructions of the software and/or firmware stored therein, to perform the methods and operations described herein, in accordance with the various embodiments.

Therefore, another aspect of the various embodiments is a computer readable medium, in other words a non-volatile, non-transitory memory storing executable instructions for execution by at least one processor. The at least one processor, when executing the executable instructions is thus operative to perform the methods and operations described herein, in accordance with the various embodiments.

While various embodiments have been illustrated and described, it is to be understood that the invention is not so limited. Numerous modifications, changes, variations, substitutions and equivalents will occur to those skilled in the art without departing from the scope of the present invention as defined by the appended claims.

What is claimed is:

1. A method comprising:
   intercepting, by a device comprising a processor, correlation instructions related to a plurality of meta-content elements associated with a primary content;
   selecting at least one meta-content element of the plurality of meta-content elements, the selected meta-content element having privacy protected information specified in privacy rules;
   determining a set of meta-content items of the selected meta-content element that are subject to a correlation restriction based on evaluation of the privacy rules with respect to meta-content items contained in the meta-content element; and
   enforcing the privacy rules for the set of meta-content items, wherein the enforcing the privacy rules comprises restricting co-occurrence of at least two meta-content items of the set of meta-content items, and wherein the restricting co-occurrence comprises:
   evaluating a threshold as one of a minimum value for temporal difference in occurrence of the at least two meta-content items, a difference in location of the at least two meta-content items, or a difference in context between the at least two meta-content items.

2. The method of claim 1, wherein the enforcing the privacy rules for the set of meta-content items further comprises:
   enforcing the privacy rules by at least one of preventing execution of the correlation instructions, excluding the selected at least one meta-content element from a correlation based on the correlation instructions, excluding the set of meta-content items from a correlation based on the correlation instructions, or restricting access to a correlation result based on the correlation instructions.

3. The method of claim 1, wherein the restricting co-occurrence further comprises:
   preventing the at least two meta-content items from occurring in a correlation result based on the correlation instructions.

4. The method of claim 3, wherein the restricting co-occurrence further comprises:
   preventing the at least two meta-content items from occurring in a single meta-content element produced as a portion of the correlation result based on the correlation instructions.

5. The method of claim 1, wherein the intercepting the correlation instructions comprises:
   intercepting a request from a client application, the request including the correlation instructions.

6. The method of claim 1, wherein the restricting co-occurrence further comprises:
   evaluating the threshold for co-occurrence of the at least two meta-content items, the threshold defined in the privacy rules, and performing the restricting co-occurrence based on the threshold.

7. The method of claim 2, wherein the enforcing the privacy rules by restricting access to a correlation result based on the correlation instructions further comprises:
deleting the correlation result.

8. The method of claim 2, wherein the enforcing the privacy rules further comprises:
initiating an alert based on a determination that the co-occurrence of the at least two meta-content items violates the privacy rules.

9. An apparatus, comprising:
at least one processor; and
memory, operatively coupled to the processor, containing executable instructions for execution by the at least one processor, wherein the at least one processor, upon executing the executable instructions is operable to perform operations comprising:
interception of correlation instructions related to a plurality of meta-content elements associated with a primary content;
selection of at least one meta-content element of the plurality of meta-content elements, the selected meta-content element having privacy protected information specified in privacy rules;
determination of a set of meta-content items of the selected meta-content element that are subject to a correlation restriction based on evaluation of the privacy rules with respect to a meta-content item contained in the meta-content element; and
enforcement of the privacy rules for the set of meta-content items, wherein the enforcement of the privacy rules comprises restriction of co-occurrence of at least two meta-content items of the set of meta-content items, and wherein the restriction of co-occurrence comprises:
evaluation of a threshold of a minimum value for a difference in location of the at least two of the set of meta-content items, the threshold being defined in the privacy rules.

10. The apparatus of claim 9, wherein the operations further comprise:
enforcement of the privacy rules by at least one of prevention of execution of the correlation instructions, exclusion of the selected at least one meta-content element from a correlation based on the correlation instructions, exclusion of the set of meta-content items from a correlation based on the correlation instructions, or restriction of access to a correlation result based on the correlation instructions.

11. The apparatus of claim 10, wherein the operations further comprise:
enforcement of the privacy rules by restricting access to a correlation result based on the correlation instructions by deleting the correlation result.

12. The apparatus of claim 10, wherein the operations further comprise:
initiation of an alert when the co-occurrence of the at least two meta-content items violates the privacy rules.

13. The apparatus of claim 9, wherein the operations further comprise:
prevention of the at least two meta-content items from occurring in a correlation result based on the correlation instructions.

14. The apparatus of claim 13, wherein the operations further comprise:
prevention of the at least two meta-content items from occurring in a single meta-content element, wherein the single meta-content element is produced as a portion of the correlation result based on the correlation instructions.

15. The apparatus of claim 9, wherein the operations further comprise:
interception of the correlation instructions by intercepting a request from a client application, wherein the request includes the correlation instructions.

* * * * *